(12) United States Patent
Mohri

(10) Patent No.: US 12,120,071 B2
(45) Date of Patent: Oct. 15, 2024

(54) INFORMATION PROCESSING APPARATUS, INFORMATION PROCESSING SYSTEM, AND INFORMATION PROCESSING METHOD

(71) Applicant: Takanori Mohri, Kanagawa (JP)

(72) Inventor: Takanori Mohri, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/840,620

(22) Filed: Jun. 15, 2022

(65) Prior Publication Data
US 2023/0006949 A1  Jan. 5, 2023

(30) Foreign Application Priority Data
Jul. 2, 2021 (JP) .................. 2021-110763

(51) Int. Cl.
H04L 51/02 (2022.01)
G06F 40/166 (2020.01)

(52) U.S. Cl.
CPC ............ H04L 51/02 (2013.01); G06F 40/166 (2020.01)

(58) Field of Classification Search
CPC ....................................... H04L 51/02
See application file for complete search history.

(56) References Cited

U.S. PATENT DOCUMENTS

| | | | |
|---|---|---|---|
| 2020/0026734 A1 | 1/2020 | Mohri | |
| 2020/0364724 A1* | 11/2020 | Pulugurtha et al. | G06Q 30/016 |
| 2021/0056508 A1* | 2/2021 | Lassalle ............... | G06Q 10/101 |
| 2021/0092080 A1* | 3/2021 | Kitoh ..................... | H04L 51/02 |
| 2021/0165787 A1 | 6/2021 | Kimura et al. | |
| 2021/0165849 A1 | 6/2021 | Mohri | |
| 2023/0006949 A1* | 1/2023 | Mohri ..................... | H04L 51/02 |

FOREIGN PATENT DOCUMENTS

| | | |
|---|---|---|
| JP | 2004-265349 A | 9/2004 |
| JP | 2019-133418 | 8/2019 |
| JP | 2019-185191 | 10/2019 |
| JP | 2020-013492 | 1/2020 |
| JP | 2021-051385 A | 4/2021 |

OTHER PUBLICATIONS

Office Action issued Apr. 18, 2023 in Japanese Patent Application No. 2021-110763, 12 pages.

* cited by examiner

Primary Examiner — James J Debrow
(74) Attorney, Agent, or Firm — XSENSUS LLP

(57) ABSTRACT

An information processing apparatus, an information processing system, and an information processing method. The information processing apparatus transmits to a first terminal, an answer to a question transmitted from the first terminal based on question and answer information, and receives editing of the question and answer information, in a case the question and answer information belongs to a category with editing authority, the editing authority being assigned to an account logged in from a second terminal.

18 Claims, 22 Drawing Sheets

FIG. 6

| CATEGORY | | |
|---|---|---|
| FIRST LAYER | SECOND LAYER | ... |
| PRODUCT | MEDICAL DEVICE | ... |
| | IMAGING DEVICE | ... |
| COMPANY INFORMATION | – | ... |
| RECRUIT INFORMATION | NEW GRADUATE RECRUITMENT | ... |
| | MID-CAREER RECRUITMENT | ... |

FIG. 7

| ID | CATEGORY | QUESTION | ANSWER |
|---|---|---|---|
| 0105 | MEDICAL DEVICE | PLEASE TELL ME ABOUT MEDICAL DEVICES. | PLEASE REFER TO THE FOLLOWING URL REGARDING MEDICAL DEVICES. https://www.hoge1.com |
| 0106 | NEW GRADUATE | PLEASE TELL ME THE SCHEDULE FOR RECRUITMENT OF NEW GRADUATES. | PLEASE REFER TO THE FOLLOWING URL REGARDING RECRUITMENT OF NEW GRADUATES. https://www.hoge2.com |

FIG. 8

| LOGIN ID | PASSWORD | NAME | EDITABLE CATEGORY FEASIBLE CATEGORY | FEASIBILITY OF MANNED CHAT | MANNED CHAT STATUS |
|---|---|---|---|---|---|
| XX@YY.com | ******** | MICK | RECRUITMENT INFORMATION | YES | NOT AVAILABLE |
| XXX@YY.com | ******** | KEITH | MEDICAL DEVICE | YES | SUPPORTING |
| XXXX@YY.com | ******** | RON | PRODUCT | YES | NOT AVAILABLE |
| XXXXX@YY.com | ******** | CHARLIE | COMPANY INFORMATION, RECRUITMENT INFORMATION | NO | — |

FIG. 9

| SESSION ID | DATE AND TIME | DIALOG HISTORY | | QUESTIONER ID | CATEGORY | RESO-LUTION FLAG |
|---|---|---|---|---|---|---|
| | | SPEAKER | DIALOG CONTENT | | | |
| XXXXXX | 06/05/2021 10:00:00.123 | USER | MEDICAL | 1111-aaaa | MEDICAL | — |
| | | BOT | PLEASE REFER TO THE FOLLOWING URL REGARDING MEDICAL DEVICES. https://www.hoge1.com | | | |
| | | USER | I WANT TO CHAT WITH PERSON IN CHARGE. | | | |
| | | BOT | YOU ARE CONNECTED TO PERSON IN CHARGE. PLEASE CHAT. | | | |
| | | USER | PLEASE TELL ME HOW TO CUSTOM ORDER MEDICAL DEVICE. | | | |
| | | KEITH | WHICH MEDICAL DEVICE WOULD YOU LIKE TO CUSTOM ORDER? | | | |
| ZZZZZZ | 06/05/2021 10:00:10.567 | USER | COMPANY TELEPHONE NUMBER | 2222-bbbb | COMPANY INFORMATION | YES |
| | | BOT | OUR REPRESENTATIVE PHONE NUMBER IS 00-0000-0000. | | | |

FIG. 10

Add Account

Login ID (Email Address)
114 — Enter Email Address

115 — Password
Enter Password

Family Name  116
Enter Family Name

First Name  117
Enter First Name

Authority  113
111 — Designated Category Is Editable  ☐ Manned Chat Feasible

Editable Category
🔍 Select Category

112 —
Product
  Medical Device
  Imaging Device
Company Information
Recruitment Information
  New Graduate
  Mid-Career
...

Multiple Selections Accepted

FIG. 11

| Administrator Settings | Operation Log | Reset Settings | Publish Settings |

+ Edit Account

Account Management

| Account | Edit | | | |
|---|---|---|---|---|
| Mick | All Editable | ☑ Manned Chat Feasible | | |
| Keith | Question and Answer Editable | ☐ Manned Chat Feasible | | |
| Ron | Designated Category is Editable | | | |
| Charlie | Browsable | 🔍 Product / Medical Device / Imaging Device / Company Information / Recruitment Information / New Graduate / Mid-Career / ... | ☐ Manned Chat Feasible | |

Multiple Selections Accepted

Save 111, 112, 113, 120

INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2021-110763, filed on Jul. 2, 2021, in the Japan Patent Office, the entire disclosure of which is hereby incorporated by reference herein.

BACKGROUND

Technical Field

The present disclosure relates to an information processing apparatus, an information processing system, and an information processing method.

Related Art

Some information processing systems recognize patterns such as text, voice, or images input by a user through a network. A so-called chatbot system is known in which the information processing system searches for question and answer information based on a result of pattern recognition, and answers a question asked by the user, controls a device, or reduces the number of answers by a category of the question.

SUMMARY

Embodiments of the present disclosure describe an information processing apparatus, an information processing system, and an information processing method. The information processing apparatus transmits to a first terminal, an answer to a question transmitted from the first terminal based on question and answer information, and receives editing of the question and answer information, in a case the question and answer information belongs to a category with editing authority, the editing authority being assigned to an account logged in from a second terminal.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a table illustrating an example of category management information stored in a category management information storage unit;

FIG. 7 is a table illustrating an example of question and answer information stored in a question and answer information storage unit;

FIG. 8 is a table illustrating an example of account information stored in an account information storage unit;

FIG. 9 is a table illustrating an example of chat history information stored in a chat history information storage unit;

FIG. 10 is a diagram illustrating an example of an account registration screen in which an administrator newly registers account information;

FIG. 11 is a diagram illustrating an example of an account editing screen in which the administrator edits the account information;

Figure 1:
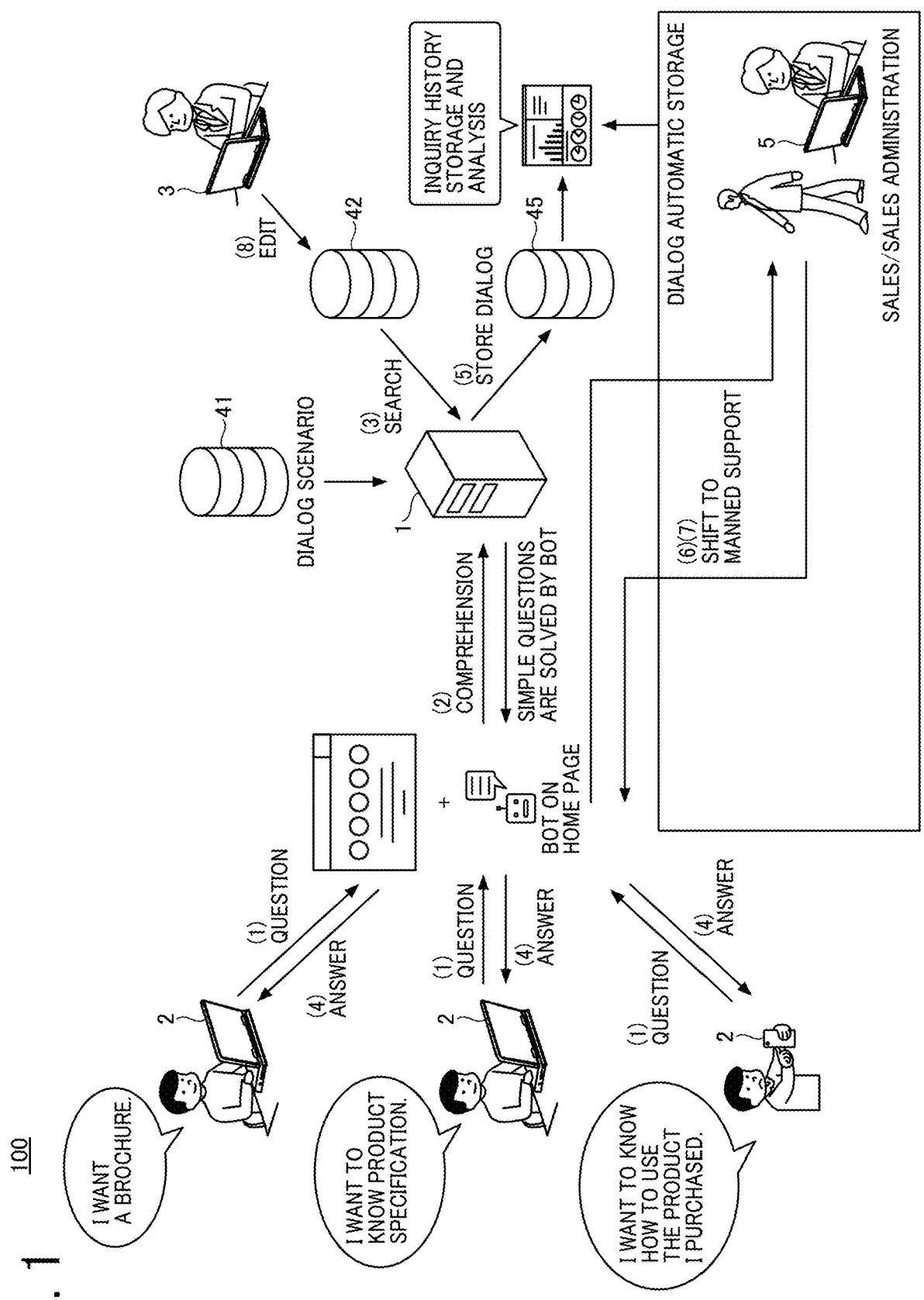
FIG. 1 is a diagram illustrating an outline of operation of a chatbot system capable of manned support.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, as an example of the embodiment for carrying out the present disclosure, a chatbot system and an information management method performed by the chatbot system are described with reference to the drawings.

FIG. 1 is a diagram illustrating an outline of operation of the chatbot system 100 capable of manned support. A web browser, which operates on a user terminal 2, executes a web application provided by a server 1. The web application implements a chatbot that answers a user's question.

(1) For example, a user who wants a catalog, a user who wants to know specifications of a product, or a user who does not know how to use a purchased product inputs a question to the user terminal 2 on which the web application is running.

(2) The server 1 extracts one or more keywords from the question and interprets content of the question. The server 1 may be an artificial intelligence (AI) that has learned correspondence between a question and an answer.

(3) The server 1 acquires an answer corresponding to the question from a question and answer information storage unit 42.

(4) The server 1 transmits the answer to the user terminal 2 (an example of a first terminal) based on a dialog scenario, a number of answers including presence or absence of the answer, and the like.

(5) The server 1 stores a log of inquiries, called inquiry history, such as the correspondence between questions and answers, in a chat history information storage unit 45.

(6) On the other hand, when the server 1 did not find the answer (including a case where the user did not find an expected answer), the user inputs a request for manned support to the user terminal 2. Content of past chat is transferred to an operator who can handle a particular category of questions in the chat.

In this way, the chatbot system 100 automatically determines the operator corresponding to the category of questions the user is asking and transfers the chat.

(7) Since the operator inputs the answer to the question into an operator terminal 5 by based on his or her own knowledge and researched content, the user terminal 2 can easily receive the answer expected by the user.

(8) The administrator can edit the question and answer information in order to enhance the answer to the question by operating the administrator terminal 3 (an example of a second terminal). The category of the question and answer information for which an editing authority is assigned is set in advance for each administrator, and the administrator can edit the question and answer information belonging to the category for which the editing authority is assigned.

Since the category of question and answer information for which editing authority is assigned is fixed for each administrator, each administrator is not permitted to edit the question and answer information managed by departments other than his or her own department, and accidental editing of the question and answer information managed by other department is prevented.

In this disclosure, conversation is a process of talking and listening to each other and proceeding a common story. The conversation may proceed with alternating questions and answers. A question is to ask a question or reason, or to provide information for that purpose. An answer is a reply to the question. Content of the conversation is not limited to the questions and answers.

A chat is a conversation, where multiple people enter characters in real time (either by using the keyboard or by voice). Conversations and chats do not have to be strictly distinguished.

A bot is an application or program for automating certain tasks or processes. In the present embodiment, the chatbot may be referred to as a bot.

A person who can edit the question and answer information is referred to as the administrator. As long as a person has editing authority, the person is referred to as the administrator. The editing authority may not be assigned for each administrator. The department to which the administrator belongs may be assigned with the editing authority for each category. For example, an administrator belonging to a personnel department has the editing authority of a personnel category.

Figure 2:
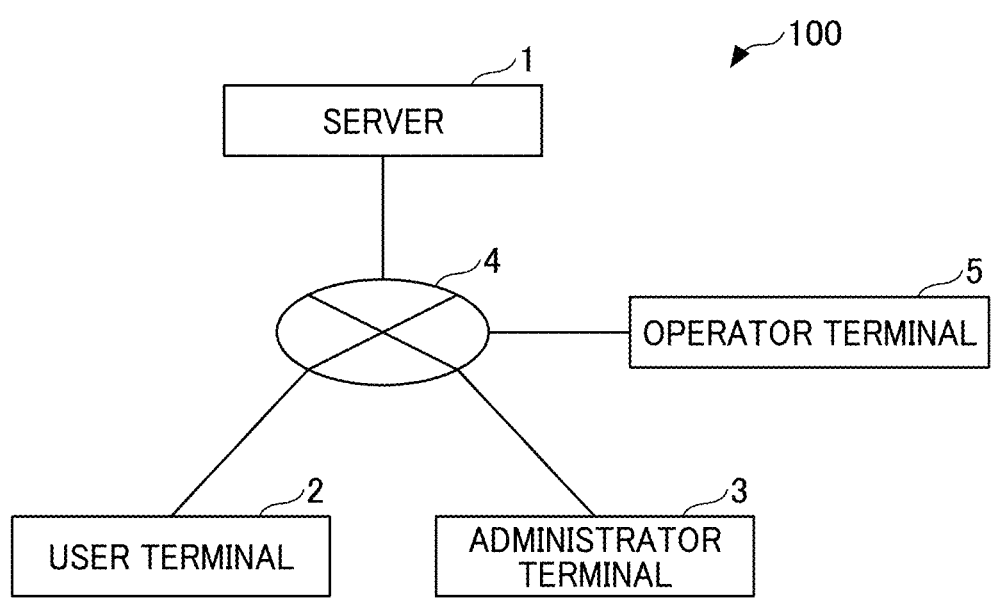
FIG. 2 is a diagram illustrating an example of an overall configuration of a chatbot system.

FIG. 2 is a diagram illustrating an example of an overall configuration of the chatbot system 100. The chatbot system 100 includes a server 1. The server 1 may communicate with one or more of the user terminal 2, the administrator terminal 3, and an operator terminal through a network.

The server 1 is an example of an information processing apparatus that provides a chatbot service.

The server is a computer operating according to software, which functions to provide information and processing results in response to a request from a client. The server 1 may reside on the internet or may reside on-premises. In the present embodiment, the server 1 resides on-premises and includes a mechanism for transmitting a chat request from outside the company to the server 1.

Further, the server 1 may be implemented by cloud computing. Cloud is a term used when a particular hardware resource is not intended.

The server 1 may be implemented by one information processing apparatus or a plurality of information processing apparatuses. Hereinafter, an example in which one server 1 provides a service is described.

The user terminal 2 is an information processing apparatus in which a user inputs a question and browses an answer in the chatbot service. The user may be an employee or an outsider. A web browser or an application (referred to as a native application as opposed to the web application) is operating on the user terminal 2. Specific examples of the user terminal 2 includes a smartphone, a mobile phone, a tablet terminal, a game machine, a personal digital assistant (PDA), a digital camera, a wearable personal computer (PC), a PC, and the like, but the user terminal 2 is not limited to these examples.

The administrator terminal 3 is an information processing apparatus in which the administrator or the like performs operations such as editing question and answer information in order to manage the server 1 and the like. The web browser or the application (referred to as the native application as opposed to the web application) is operating on the administrator terminal 3. Specific examples of the administrator terminal 3 includes the smartphone, the mobile phone, the tablet terminal, the game machine, the PDA, the digital camera, the wearable PC, the PC, and the like, but the administrator terminal 3 is not limited to these examples.

The operator terminal 5 is an information processing apparatus in which an operator performing the manned support performs an operation such as inputting an answer in the chatbot service. The web browser or an application (referred to as a native application with respect to the Web application) is operating on the operator terminal 5. Specific examples of the operator terminal 5 includes the smartphone, the mobile phone, the tablet terminal, the game machine, the PDA, the digital camera, the wearable PC, the PC, and the like, but the operator terminal 5 is not limited to these examples. Further, the administrator and the operator may be the same person (the administrator terminal 3 and the operator terminal 5 may be the same terminal).

The server 1, the user terminal 2, the administrator terminal 3, and the operator terminal 5 are connected to each other through the network 4. For example, the network 4 is implemented by one or more combinations of local area network (LAN), wide area network (WAN), the internet, and the like. A telephone communication network may be connected to the network 4. Part or all of the network 4 may be wired or wireless. Further, short-range communication such as visible light communication, BLUETOOTH (registered trademark), infrared communication, and the like may be included.

The server 1 communicates with the user terminal 2, the administrator terminal 3, the operator terminal 5, and the like. For example, the server 1 provides a chatbot service or the like in which response information, such as an answer, is returned to input information such as a question input by the user.

Further, the server 1 provides services such as sending and receiving messages, so-called chat, between the user terminal 2 and the operator terminal 5, or between a plurality of user terminals. The server 1 provides an instant message service or the like.

Figure 3:
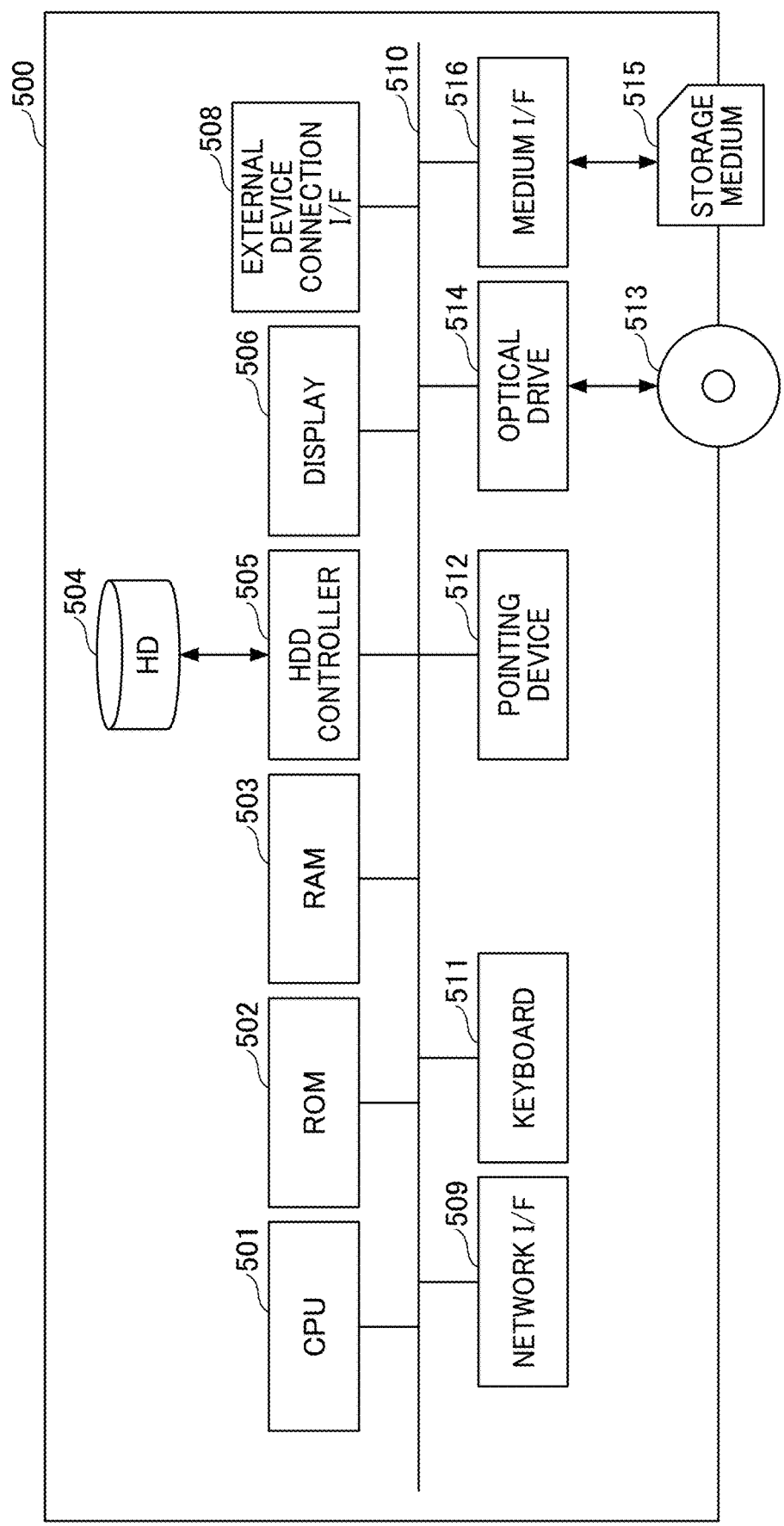
FIG. 3 is a block diagram illustrating an example of a hardware configuration of a computer.

The server 1, the user terminal 2, the administrator terminal 3, and the operator terminal 5 of FIG. 2 are each implemented by, for example, a computer having a hardware configuration illustrated in FIG. 3. FIG. 3 is a block diagram illustrating an example of a hardware configuration of the computer. The computer 500 of FIG. 3 includes a central processing unit (CPU) 501, a read only memory (ROM) 502, a random access memory (RAM) 503, a hard disk (HD) 504, a hard disk drive (HDD) controller 505, a display 506, an external device connection interface (I/F) 508, a network I/F 509, a bus line 510, a keyboard 511, a pointing device 512, an optical drive 514 and a medium I/F 516.

Among these elements, the CPU 501 controls entire operation of the computer. The ROM 502 stores a program such as an initial program loader (IPL) used for executing the CPU 501. The RAM 503 is used as a work area for the CPU 501. The HD 504 stores various data such as the programs. The HDD controller 505 controls reading and writing of various data from and to the HD 504 under control of the CPU 501. The display 506 displays various information such as a cursor, menu, window, character, or image. The external device connection I/F 508 is an interface for connecting various external devices. The external device in this case is, for example, a Universal Serial Bus (USB) memory or a printer. The network I/F 509 is an interface that controls data communication performed with an external device through the communication network. The bus line 510 is an address bus, a data bus, or the like for electrically connecting each component such as the CPU 501 illustrated in FIG. 3.

The keyboard 511 is an example of an input device provided with a plurality of keys for allowing a user to input characters, numerals, or various instructions. The pointing device 512 is an example of the input device that allows the user to select or execute a specific instruction, select a target for processing, or move a cursor being displayed. The optical drive 514 controls reading or writing of various data to an optical storage medium 513 as an example of a removable recording medium. The optical storage medium 513 is a Compact Disc (CD), Digital Versatile Disc (DVD), BLU-RAY (registered trademark), or the like. The medium I/F 516 controls reading and writing (storing) of data from and to a storage medium 515 such as a flash memory.

Figure 4:
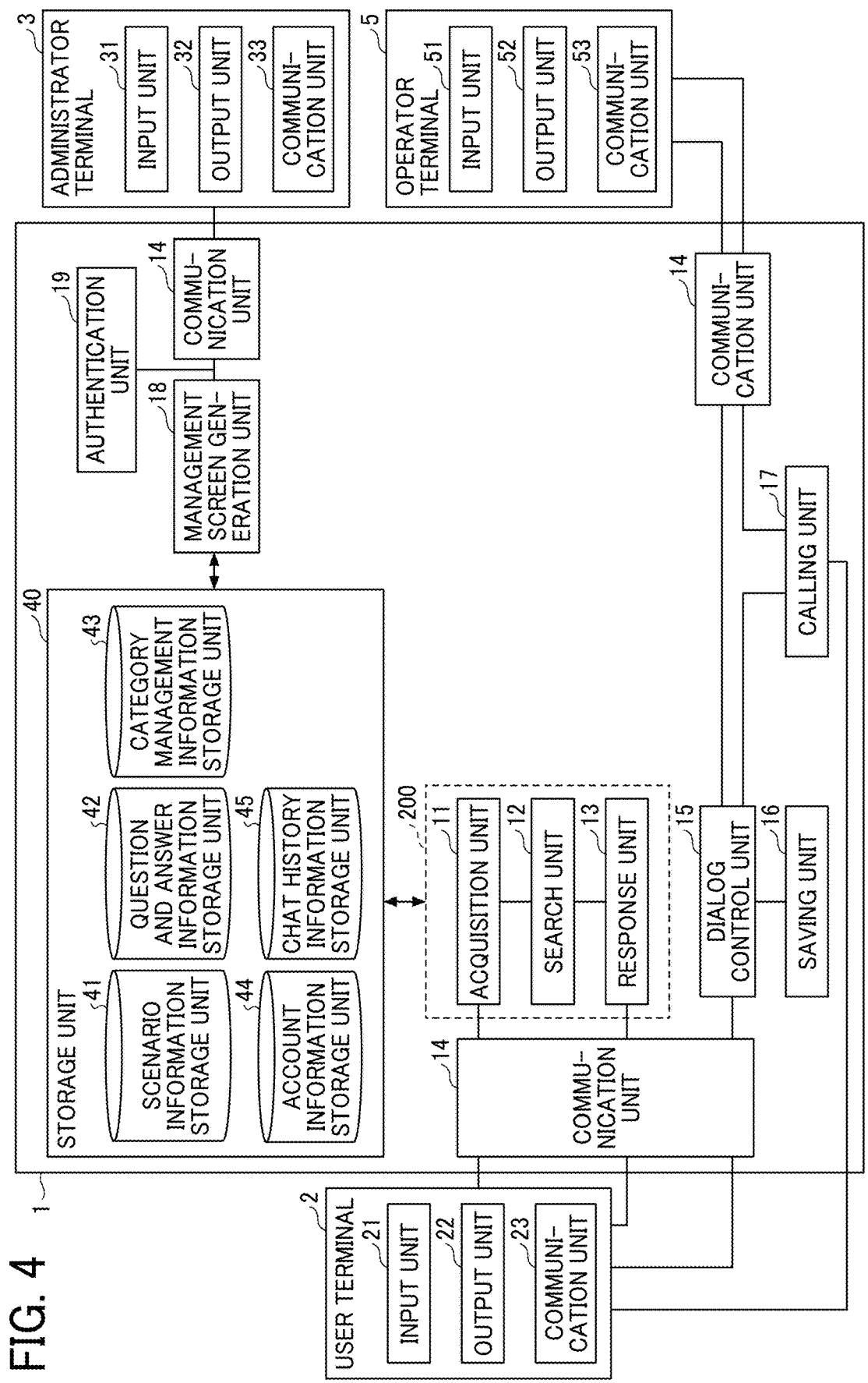
FIG. 4 is a block diagram illustrating an example of a functional configuration of a server, a user terminal, an administrator terminal, and an operator terminal of the chatbot system.

FIG. 4 is a block diagram illustrating an example of a functional configuration of the server 1, the user terminal 2, the administrator terminal 3, and the operator terminal 5 of the chatbot system 100.

The server 1 includes an acquisition unit 11, a search unit 12, a response unit 13, a communication unit 14, a dialog control unit 15, a saving unit 16, a calling unit 17, a management screen generation unit 18, and an authentication unit 19. These functions of the server 1 are implemented by the CPU 501 of the computer 500 illustrated in FIG. 3 executing a program developed from the HD 504 to the RAM 503.

The dialog control unit 15 controls the entire chatbot service that receives a question from the user terminal 2 and sends an answer to the user terminal 2 based on the scenario. The dialog control unit 15 controls the dialog so that the user can input an appropriate question according to the presence or absence and the number of answers. The dialog control unit 15 determines the operator to be called based on the category of the question and answer information and the category that the operator can handle.

Further, the dialog control unit 15 controls the output unit 22 of the user terminal 2 to display an operator chat button to chat with the person in charge and a manned support button 171 based on the category of the question and answer information and the category that the operator can handle.

The acquisition unit 11 acquires input information such as the question input to the user terminal 2 through the communication unit 14. The search unit 12 performs morphological analysis on the input information and performs search operation on the question and answer information storage unit 42. The search unit 12 decomposes the question included in each question and answer information into a plurality of keywords in advance by morphological analysis. Then, the search unit 12 decomposes the received question sentence into a plurality of keywords by morphological analysis. Further, the search unit 12 refers to a separately registered synonym (for example, "hiring" or the like is registered as a synonym for "employment"), and searches for question and answer information using the synonym as well. The search unit 12 calculates the degree of matching between the user's question and the question of the question and answer information and determines N answers in descending order of the degree of matching equal to or higher than the threshold value. The response unit 13 responds to the user terminal 2 with the answer obtained by the search unit 12 as response information through the communication unit 14.

The output unit 22 outputs response information to the input information input by the acquisition unit 11, the search unit 12, or the response unit 13 through the input unit 21. Accordingly, the bot 200 is implemented by the acquisition unit 11, the search unit 12, and the response unit 13.

The search unit 12 may determine the keyword by artificial intelligence (AI) that has learned the correspondence between the question and intention of the question, in addition to the morphological analysis. In this case, the intention guides keyword extraction, such that keywords that are not included in the question can also be extracted. Further, the search unit 12 determines a keyword in consideration of situation such as the time zone and the weather in addition to the question.

The saving unit 16 stores the chat history in the chat history information storage unit 45. The calling unit 17 calls the operator terminal 5 determined by the dialog control unit 15 in response to a user request for manned support. In response to acquiring a dialog start from the operator terminal 5, the calling unit 17 notifies the dialog control unit 15. The dialog control unit 15 starts a chat between the user terminal 2 and the operator terminal 5.

The management screen generation unit 18 generates a management screen to be displayed by the administrator terminal 3 and provides screen information to the administrator terminal 3. The screen information is a program described in HyperText Markup Language (HTML), Extensible Markup Language (XML), a script language, and Cascading Style Sheet (CSS). The structure of the web page is mainly specified by HTML, the operation of the web page is specified by the script language, and the style of the web page is specified by CSS.

The authentication unit 19 authenticates the administrator with a username, a password, and the like. The administrator is identified based on a successful authentication. The authentication may be performed by an external authentication server, or single sign-on such as OAuth may be used.

The user terminal 2, the administrator terminal 3, and the operator terminal 5 includes input units 21, 31, 51, output units 22, 32, 52, and communication units 23, 33, 53, respectively. These functions included in the user terminal 2, the administrator terminal 3, and the operator terminal 5 are functions implemented by the CPU 501 included in the computer 500 illustrated in FIG. 3 executing a program developed from the HD 504 to the RAM 503.

The input units 21, 31, and 51 receive inputs and operations from users, administrators, or operators. The output units 22, 32, and 52 output various information (answers, screens, etc.) transmitted from the server 1 to the display. The communication units 23, 33, and 53 transmit and receive various information to and from the server 1.

With reference to FIGS. 5 to 9, information stored in the storage unit 40 of the server 1 is described.

Figure 5:
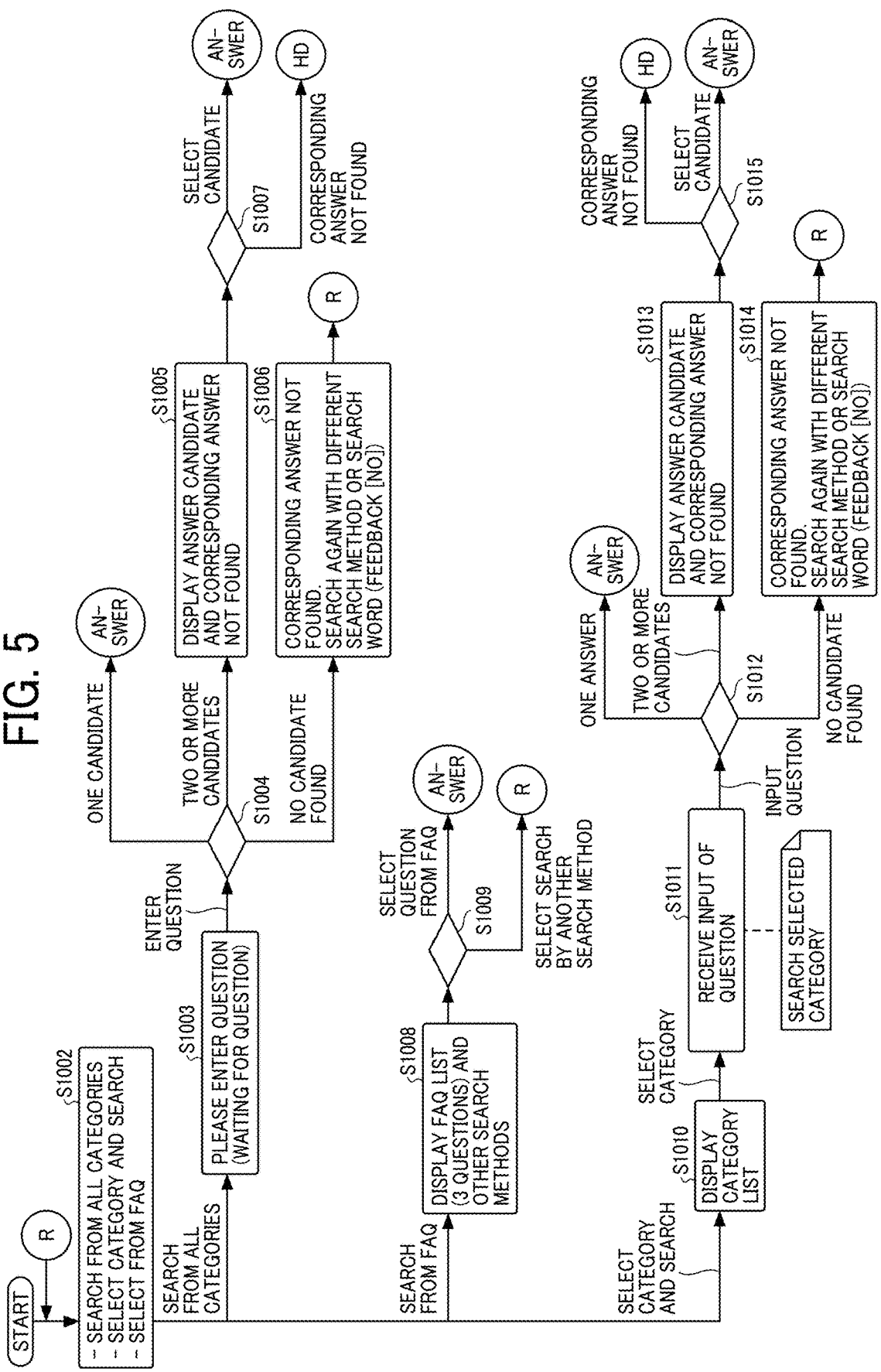
FIG. 5 is a diagram illustrating an example of a flow of dialog based on scenario information.

FIG. 5 is a diagram illustrating an example of a dialog flow based on scenario information. The scenario information storage unit 41 stores scenario information that implements dialog according to the input information. The scenario information is generated so that the dialog with the user is implemented according to a scenario stored in advance in a dialog scenario database (DB).

For example, in response to receiving the input information from the user by the acquisition unit 11, the response unit 13 responds to the question according to the scenario information as described below.

In step S1002, the dialog control unit 15 displays a selection menu of question search method on the user terminal 2. For example, the selection menu is a graphical user interface (GUI) that receives an operation, allowing the user to select one of the three options of "search from all categories", "select category and search", and "search from frequently asked questions (FAQ)". The selection menu may display four or more options or two or less options.

In response to selecting "search from all categories" from the selection menu, the scenario proceeds to step S1003.

In response to selecting "search from FAQ" from the selection menu, the scenario proceeds to step S1008. In response to selecting "select category and search" from the selection menu, the scenario proceeds to step S1010.

In step S1003, the dialog control unit 15 causes the user terminal 2 to display a message prompting the user to input a question in a character string. Further, the output unit 22 displays a GUI such as a text box on the user terminal 2, and the input unit 21 receives an operation of inputting characters that make up a question. In response to completion of input of the question ("enter question" in the figure), the scenario proceeds to step S1004.

In step S1004, the search unit 12 analyzes the character string indicating the question. Then, the search unit 12 searches the question and answer information storage unit 42 and extracts a candidate that can be an answer to the question (hereinafter, simply referred to as "candidate"). The search unit 12 may acquire a plurality of candidates as a result of the search.

As a result of the search in step S1004, in a case there is one candidate ("one candidate" in the figure), the response unit 13 responds the searched candidate as response information. In the case there are two or more candidates ("two or more candidates" in the figure) as a result of the search in step S1004, the scenario proceeds to step S1005. In the case the candidate is not found as a result of the search in step S1004 ("no candidate found" in the figure), the scenario proceeds to step S1006.

In step S1005, the output unit 22 displays on the user terminal 2, a GUI that causes the user to select whether to select one of a plurality of candidates or not to select any of the candidates.

In step S1007, in response to receiving an operation of selecting one of the candidates ("select candidate" in the figure), the dialog control unit 15 responds the selected candidate as the response information. On the other hand, in response to receiving an operation not to select any of the candidates ("corresponding answer not found" in the figure), the dialog control unit 15 displays, for example, an apology message indicating that the answer to the question is not displayed at this stage on the user terminal 2.

In step S1006, the output unit 22 displays an apology message prompting the user to perform a re-search on the user terminal 2 and returns to step S1002.

In step S1008, the dialog control unit 15 refers to an inquiry history DB and extracts one or more frequently asked questions (for example, three) from other users and the like. Then, the output unit 22 displays a list of questions on the user terminal 2. Further, the output unit 22 displays a GUI for selecting another search method on the user terminal 2.

In step S1009, when a question is selected ("select question from FAQ" in the figure), the search unit 12 searches for an answer to the selected question from the question and answer information storage unit 42, and the response unit 13 responds the search result as the response information. On the other hand, in response to a selection of another search method in step S1009 ("select a search by another method" in the figure), the scenario returns to step S1002.

In step S1010, the dialog control unit 15 displays a list of category names on the user terminal 2. In response to an operation of selecting a category from the list of category names ("select category" in the figure), the scenario proceeds to step S1011.

In step S1011, the input unit 21 receives an operation for inputting characters that make up a question. In response to input of a question ("input question" in the figure), the acquisition unit 11 acquires input information indicating the question. Then, the scenario proceeds to step S1012.

In step S1012, the search unit 12 searches the question and answer information storage unit 42 and extracts candidates. In the case one candidate is found ("one answer" in the figure), the response unit 13 responds the searched candidate as the response information. In the case two or more candidates are found ("two or more candidates" in the figure), the scenario proceeds to step S1013. In the case no candidate is found ("no candidate found" in the figure), the scenario proceeds to step S1014.

In step S1013, the dialog control unit 15 displays on the user terminal 2, a GUI that causes the user to select whether to select one of a plurality of candidates or not to select any of the candidates.

In step S1015, in response to receiving the operation of selecting one of the candidates ("select candidate" in the figure), the dialog control unit 15 responds the selected candidate as the response information. On the other hand, in response to receiving an operation not to select any of the candidates ("corresponding answer not found" in the figure), the dialog control unit 15 displays, for example, an apology message indicating that the answer to the question is not displayed at this stage on the user terminal 2.

In step S1014, the dialog control unit 15 displays an apology message prompting the user to perform a re-search on the user terminal 2 and returns to step S1002.

The scenario information is input assuming, for example, the flow of dialog as described above. That is, the scenario information indicates a result of the administrator setting the type of GUI used in the flow of dialog, the order of outputting messages, GUI, and the like.

FIG. 6 is an example of category management information stored in the category management information storage unit 43. A category is a basic classification for classifying the question and answer information. The category management information is a list of categories that the question and answer information includes. Each item on the category management information is described in the following.

- The category management information has a hierarchical structure with major categories on the first layer and subdivided categories in the second layer. The categories may be managed in one layer. The category management information may be managed in three or more layers.
- The categories such as product, company information, and recruit information are registered in the first layer. In the second layer, categories of medical device and imaging device are associated with product, and categories of new graduate recruitment and mid-carrier recruitment are associated with the recruitment information. The categories vary depending on business of the company.

FIG. 7 is an example of the question and answer information stored in the question and answer information storage unit 42. The question and answer information is used to search for a question transmitted from the user terminal 2 and to provide an answer corresponding to the question. Each item on the question and answer information is described in the following.

- An identifier (ID) is identification information that identifies the question and answer information (correspondence between a question and an answer to the question).
- A category is a category set by the administrator for the question. By registering an appropriate category, the administrator can search for an appropriate answer by the search unit 12. The category may be the category of the first layer or of the second layer.
- The question is specific content of the question expected from the user registered by the administrator. The question is decomposed into keywords by the morphological analysis as described above, and the search unit 12 is the target to be searched by the question transmitted from the user terminal 2 (decomposed into the keywords by the morphological analysis).
- The answer is the answer to the question. The administrator registers an appropriate answer to the question.

FIG. 8 is an example of account information stored in the account information storage unit 44. The account information manages information related to a person (operator or administrator) operating the chatbot system 100. Each item on the account information is described in the following.

- A login ID is the identification information of the operator or the administrator. In FIG. 8, an email address is the login ID, but the login ID may be a combination of numbers, alphabets, symbols, etc., biometric authentication information, an integrated circuit (IC) card number, or the like.
- A password is a combination of numbers, alphabets, symbols, etc. to prove that the operator or administrator is the person in question.
- The name is the name, nickname, ID, etc. of the operator or administrator.
- An editable category or feasible category indicates a category permitted to edit in the case of the administrator and a category to perform manned support in the case of the operator.
- Feasibility of manned chat indicates whether the operator or administrator can handle manned chat. "YES" is set mainly for operators accordingly.

The administrator registers each of the above items in advance.

- The manned chat status is a current state of the operator or administrator. "Not available" is indicated while the administrator or operator is not logged in or in response to switching to the status of being away from the desk by operation. "Supporting" indicates that the operator or administrator is chatting with the user. "Standby" indicates that the operator or administrator has logged in, available, and not in the supporting status.

FIG. 9 is an example of chat history information stored in the chat history information storage unit 45. The chat history information manages the content of chat between the user and the bot or the operator. Each item in the chat history information is described in the following.

- A session ID is the identification information of the communication from the start to the end of the chat between the user and the operator. The correspondence between the user terminal 2 and the operator terminal 5 is managed by the session ID, and the answer to the question is transmitted to the user terminal 2. The session ID may be a unique number, for example, a Universally Unique Identifier (UUID) or a hash value.
- Date and time are the date and time when the user terminal 2 displayed the chat screen.
- A dialog history associates a speaker with content of dialog. The speaker is the name of the user, bot, or operator. The content of the user's remark is mainly a question, and the content of the bot or operator's remark is mainly an answer.
- A questioner ID is identification information assigned to the user who asked the question. Since the chatbot system 100 of the present embodiment can be used by any user, this questioner ID changes each time the same user accesses the chatbot system 100. Alternatively, the same user may be assigned the same questioner ID by using a cookie. A login ID of the user who logged in to the server 1 (or the native application), becomes the questioner ID.
- A category is a category determined from the question in the chat. The category is not limited to one. In addition, the category may change in the same session.
- A resolution flag is information (YES or NO) that the user entered in the feedback input field of the chat to indicate whether the question has been resolved. No input indicates that the user did not input anything.

FIG. 10 is a diagram illustrating an example of an account registration screen 110 in which an administrator newly registers the account information. The account registration screen 110 includes input fields (login ID field 114, password field 115, family name field 116, first name field 117) corresponding to the account information illustrated in FIG. 8. The description of the input fields is omitted.

An authority field 111 sets how the category that can be edited by the administrator or operator registered with this account information are restricted. For example, in FIG. 10, "designated category is editable" is set. The following four types of authority can be input in the authority field 111.

(i) All editable: "All editable" indicates that the category itself can be modified, added, or deleted (the category to which the question and answer information belongs can also be set) in addition to the information in the question and answer management table.

In addition, "all editable" includes the authority to add or edit the user accounts. The following (ii) to (iv) do not have the authority to add or edit the user accounts.

(ii) Question and answer are editable: The "question and answer are editable" indicates that the question and answer information of all categories registered in the question and answer management table can be modified, added, or deleted. The category to which the question and answer information belongs can also be set.

(iii) Designated category is editable: The "designated category is editable" indicates that the question and answer information corresponding to one or more categories designated on the account addition screen or the account edit screen can be modified, added, or deleted. The category to which the question and answer information belongs is not permitted to be set.

(iv) Browsable: The "browsable" indicates that all the question and answer information registered in the question and answer information storage unit 42 can be browsed but cannot be edited. Regarding (i) to (iii) described above, all the information registered in the question and answer information storage unit 42 can be browsed.

An editable category field 112 is a field for the administrator or operator registered with this account information to select the editable category. The administrator or operator can select the category from the search results of the category. The editable category field 112 becomes valid (input is possible) in the case the "designated category is editable" is selected in the authority field 111.

A check box 113 of "manned chat feasible" corresponds to the feasibility of manned chat set in the account information illustrated in FIG. 8. The check box 113 is checked for most of the operators.

FIG. 11 is a diagram illustrating an example of an account editing screen in which the administrator edits the existing account information. Similar to FIG. 10, the account edit screen includes an authority field 111, an editable category field 112, and a check box 113 corresponding to the feasibility of manned chat. Setting method may be the same as in FIG. 10.

The administrator has the authority to edit the question and answer information, but in some cases, the administrator accidentally edits the question and answer information in a category other than his or her specialty. Therefore, the management screen generation unit 18 of the present embodiment limits the editing of the question and answer information to the category permitted to the administrator.

Figure 12:
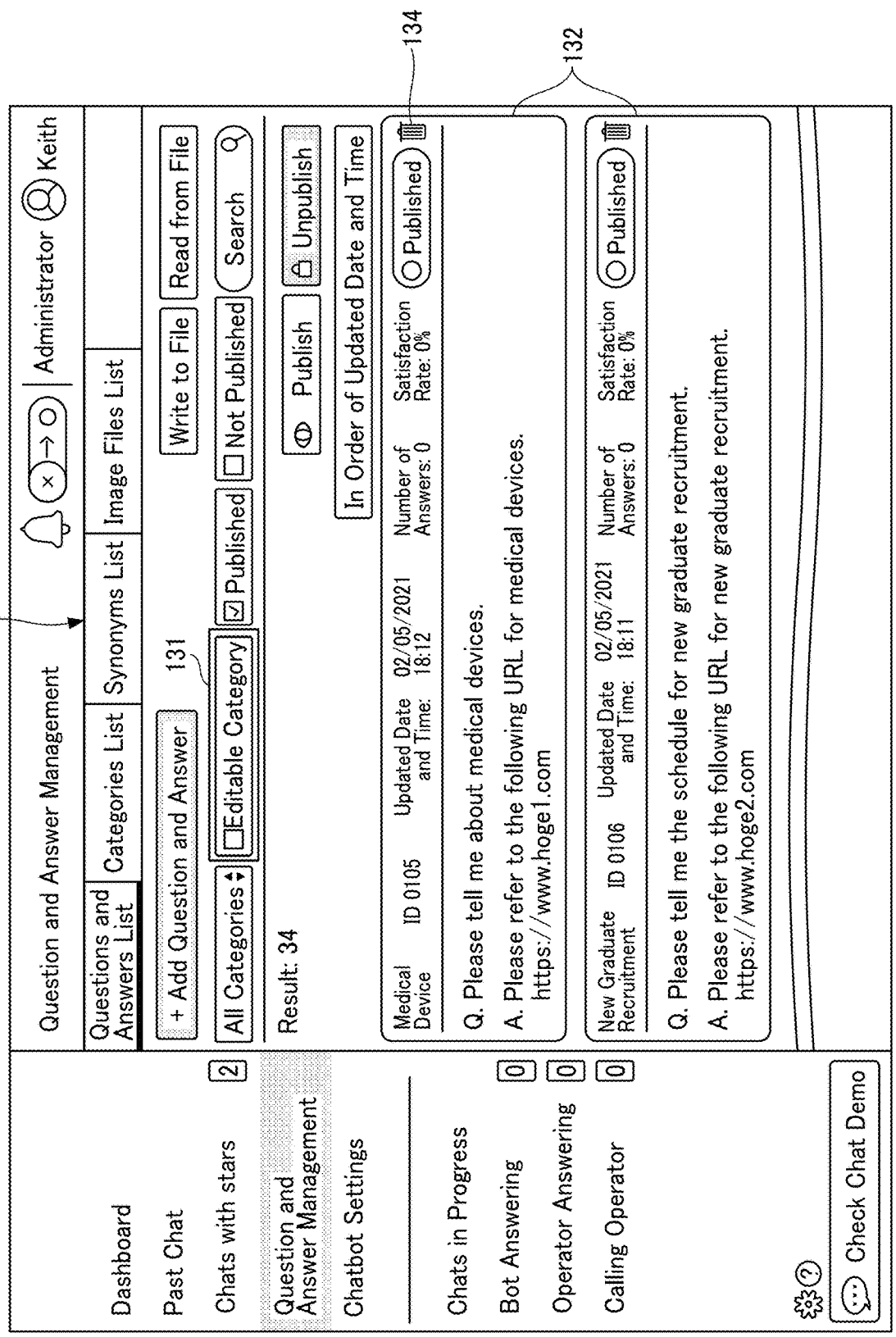
FIG. 12 is a diagram illustrating an example of a question and answer management screen.

FIG. 12 is a diagram illustrating an example of a question and answer management screen 130. On the question and answer management screen 130, a list 132 of the question and answer information stored in the question and answer information storage unit 42 is displayed. Even when the editing authority is assigned to the administrator, editing is limited to the question and answer information of the editable category.

Immediately after the administrator terminal 3 displays the question and answer management screen 130, all the question and answer information are displayed. In response to the administrator pressing an editable category button 131, display of the question and answer information on the question and answer management screen 130 is limited to the category with the editing authority assigned.

Figure 13:
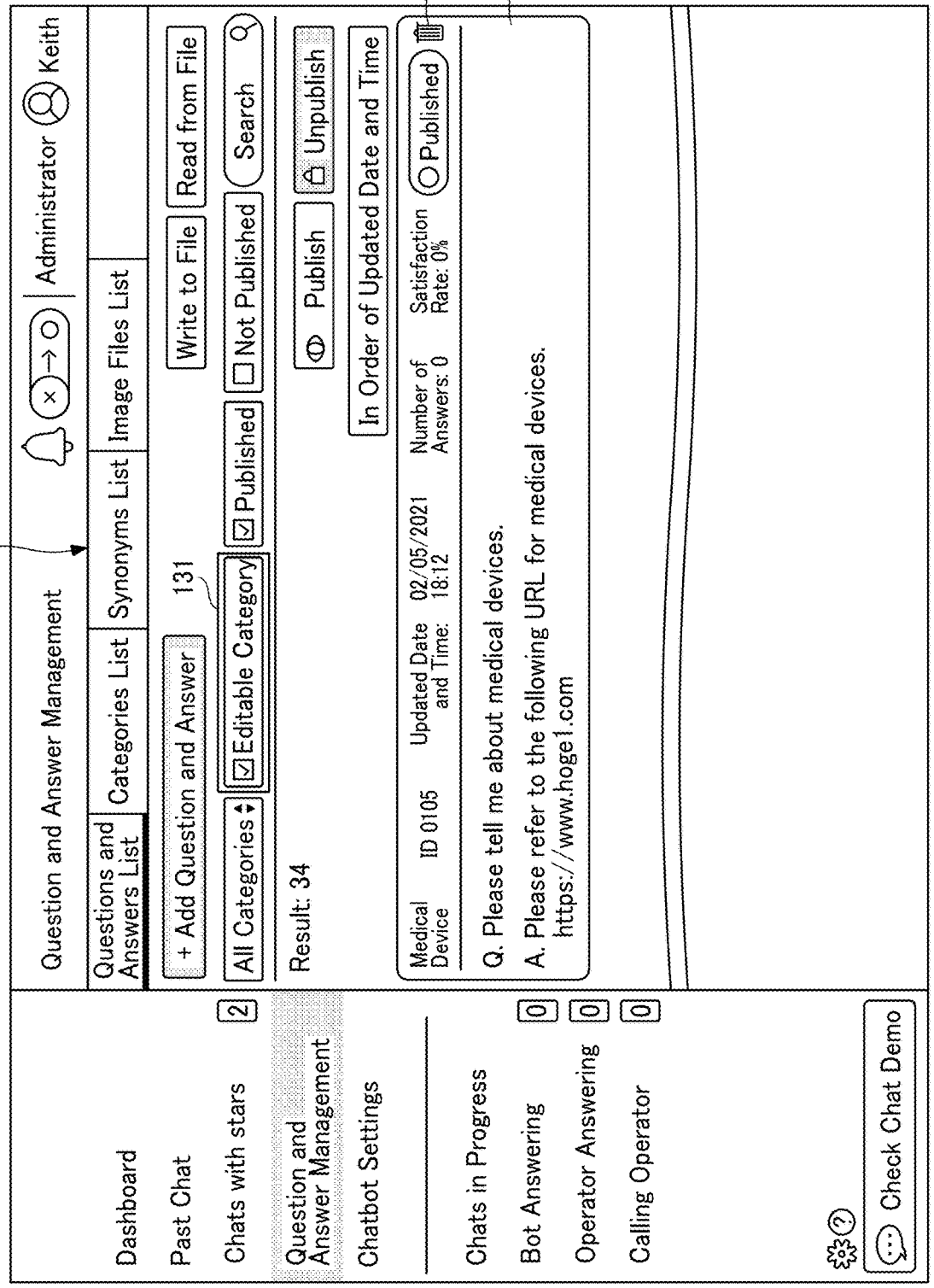
FIG. 13 is a diagram illustrating an example of the question and answer management screen displayed after the administrator presses an editable category button.

FIG. 13 is a question and answer management screen 130 displayed after the administrator presses the editable category button 131. According to the account information in FIG. 8, since the editable category of the administrator called Keith is the medical device, the management screen generation unit 18 displays the question and answer information 133 of the medical device on the question and answer management screen 130 of the administrator terminal 3. The administrator can delete this question and answer information with a delete button 134.

By doing so, it is possible to prevent the administrator from accidentally editing the question and answer information in a category that is not his or her specialty.

In the case the question and answer management screen 130 displays question and answer information for all categories and the question and answer information edited by the administrator belongs to a category that can be edited by the administrator, the management screen generation unit 18 may accept editing.

Figure 14:
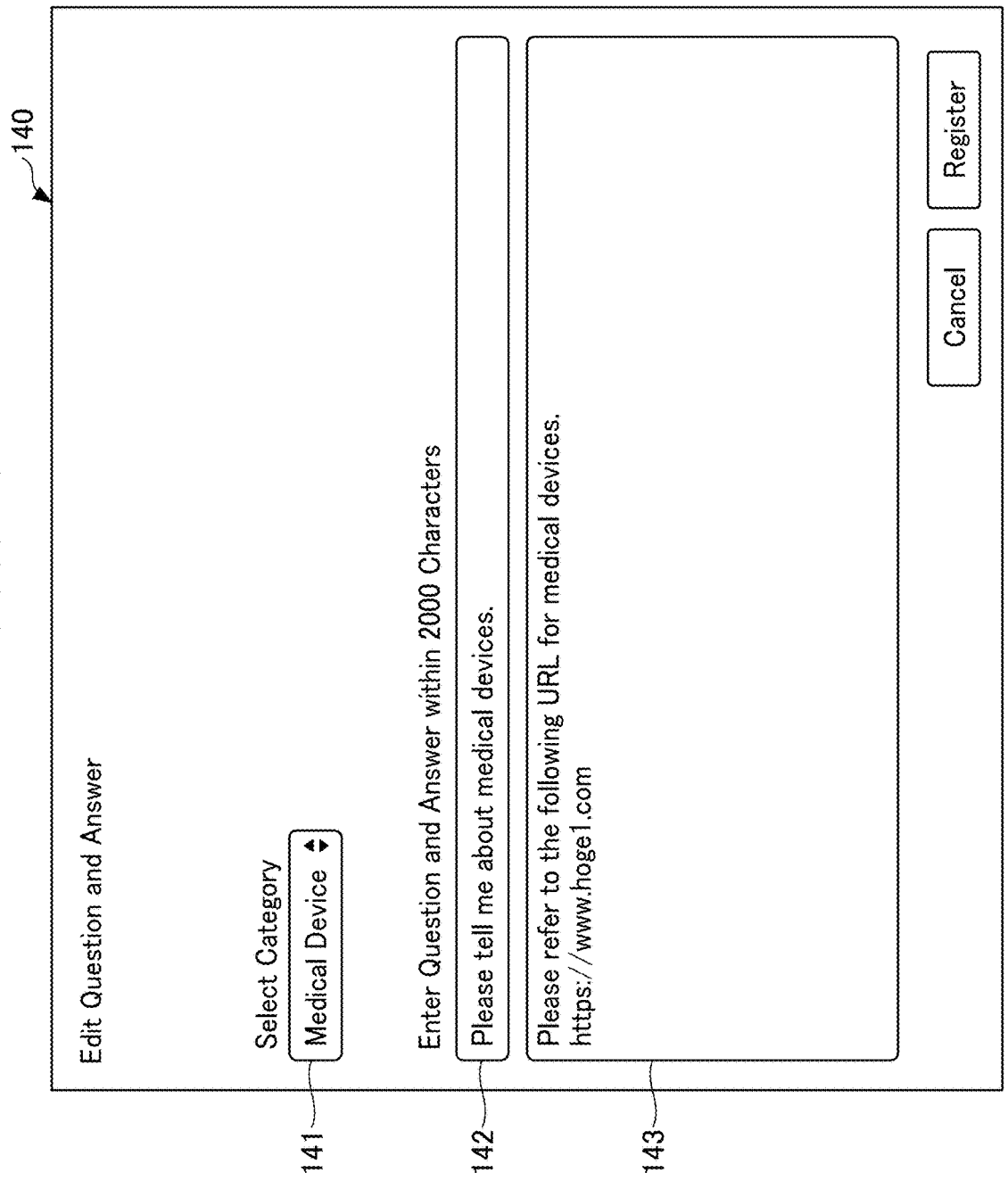
FIG. 14 is a diagram illustrating an example of a question and answer editing screen.

In response to the administrator selecting the question and answer information to edit on the question and answer management screen 130, the screen transitions to a question and answer editing screen 140 illustrated in FIG. 14.

FIG. 14 is a diagram illustrating an example of the question and answer editing screen 140. The question and answer editing screen 140 includes a category field 141, a question field 142, and an answer field 143. In the category field 141, the question field 142, and the answer field 143, the category, question, and answer stored in the question and answer information storage unit 42 are displayed. The administrator can edit the category, question, and answer as desired. In addition, the administrator can input new category, question, and answer to add new question and answer information.

Figure 15:
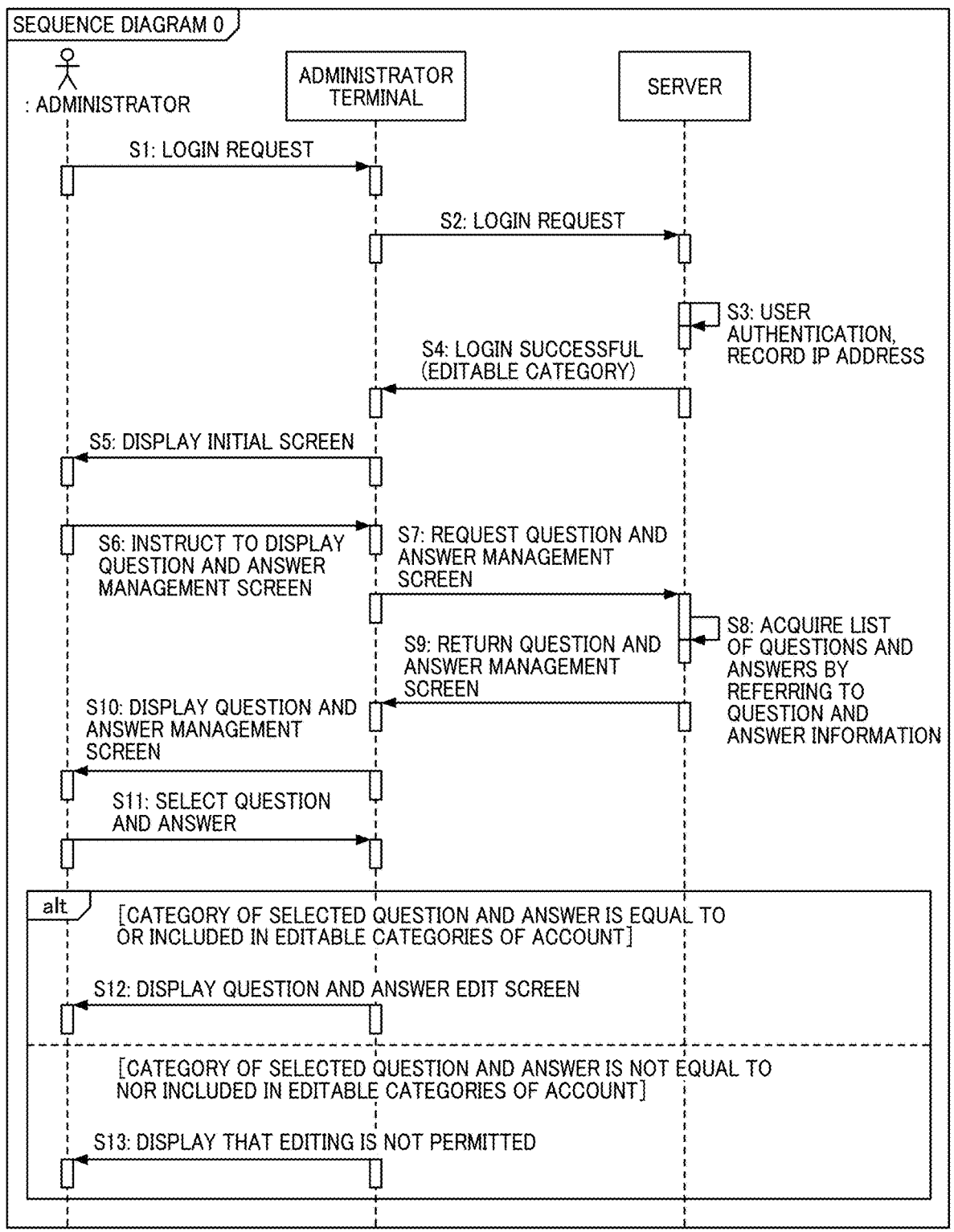
FIG. 15 is a sequence diagram illustrating an example of a process for an administrator to edit the question and answer information.

FIG. 15 is a sequence diagram illustrating an example of a process for the administrator to edit the question and answer information.

In step S1, the administrator inputs login information (username and password) into the administrator terminal 3. The input unit 31 of the administrator terminal 3 receives the input.

In step S2, the communication unit 33 sends a login request to the server 1 together with the login information.

In step S3, the communication unit 14 of the server 1 receives the login request. The authentication unit 19 authenticates using the login information, and stores the Internet Protocol (IP) address of the administrator terminal 3. The IP address of the operator terminal 5 is also stored in response to the log in by the operator. This is because the calling unit 17 communicates with the called operator terminal 5 to the destination during a manned chat.

In step S4, the authentication unit 19 of the server 1 identifies the administrator and acquires an editable category from the account information. The management screen generation unit 18 transmits screen information of an initial screen to the administrator terminal 3 through the communication unit 14.

In step S5, the communication unit 33 of the administrator terminal 3 receives the screen information of the initial screen, and the output unit 32 displays the initial screen. The initial screen may be a chat history, a list of questions and answers, and so on.

In step S6, the administrator inputs instruction to display the question and answer management screen 130 to the administrator terminal 3. The input unit 31 receives the input.

In step S7, the communication unit 33 requests the server 1 for the question and answer management screen 130.

In step S8, the communication unit 14 of the server 1 receives the request of the question and answer management screen 130, and the management screen generation unit 18 acquires a list (including categories) of the question and answer information from the question and answer information storage unit 42. At this point, the editable category of the administrator is not considered.

In step S9, the management screen generation unit 18 of the server 1 transmits the screen information of the question and answer management screen 130 to the administrator terminal 3.

In step S10, the communication unit 33 of the administrator terminal 3 receives the screen information of the question and answer management screen 130, and the output unit 32 displays the question and answer management screen 130.

In step S11, the administrator selects question and answer information. The input unit 31 receives a selection.

In step S12, in the case the category to which the selected question and answer information belongs is the same as or is included in the category editable by the administrator, the output unit 32 of the administrator terminal 3 displays the question and answer editing screen 140. In response to a pressing of the delete button in step S11, a deletion confirmation dialog (YES, NO) is displayed, and in response to a pressing of a YES button, the question and answer information is deleted.

As described above, the display and non-display according to the category are controlled by the administrator terminal 3. Such control is possible with JAVASCRIPT (registered trademark) or the like. The screen information of the question and answer management screen 130 includes control information of display and non-display according to the category.

Further, the server 1 may control display and non-display according to the category. In this case, the management screen generation unit 18 of the server 1 transmits to the administrator terminal 3, the question and answer information belonging to the category to which the administrator has the editing authority assigned. In either method, the server 1 receives editing of question and answer information belonging to the category for which the administrator has editing authority assigned.

In step S13, in the case the category to which the selected question and answer information belongs is not the same as or is not included in the category that can be edited by the administrator, the output unit 32 of the administrator terminal 3 displays that the editing authority is not assigned to the administrator. In response to a pressing of the delete button in step S11, the output unit 32 of the administrator terminal 3 displays that the authority to delete is not assigned to the administrator.

Chatting with a bot may not get an answer that users expect. In this case, the user can request to chat directly with an operator. An operator to which a chat is transferred may not be familiar with the category of question and answer information corresponding to the user's question. In the present embodiment, the chatbot system 100 improves the user's satisfaction by connecting to an operator who can handle the category of question and answer information corresponding to the user's question.

Figure 16:
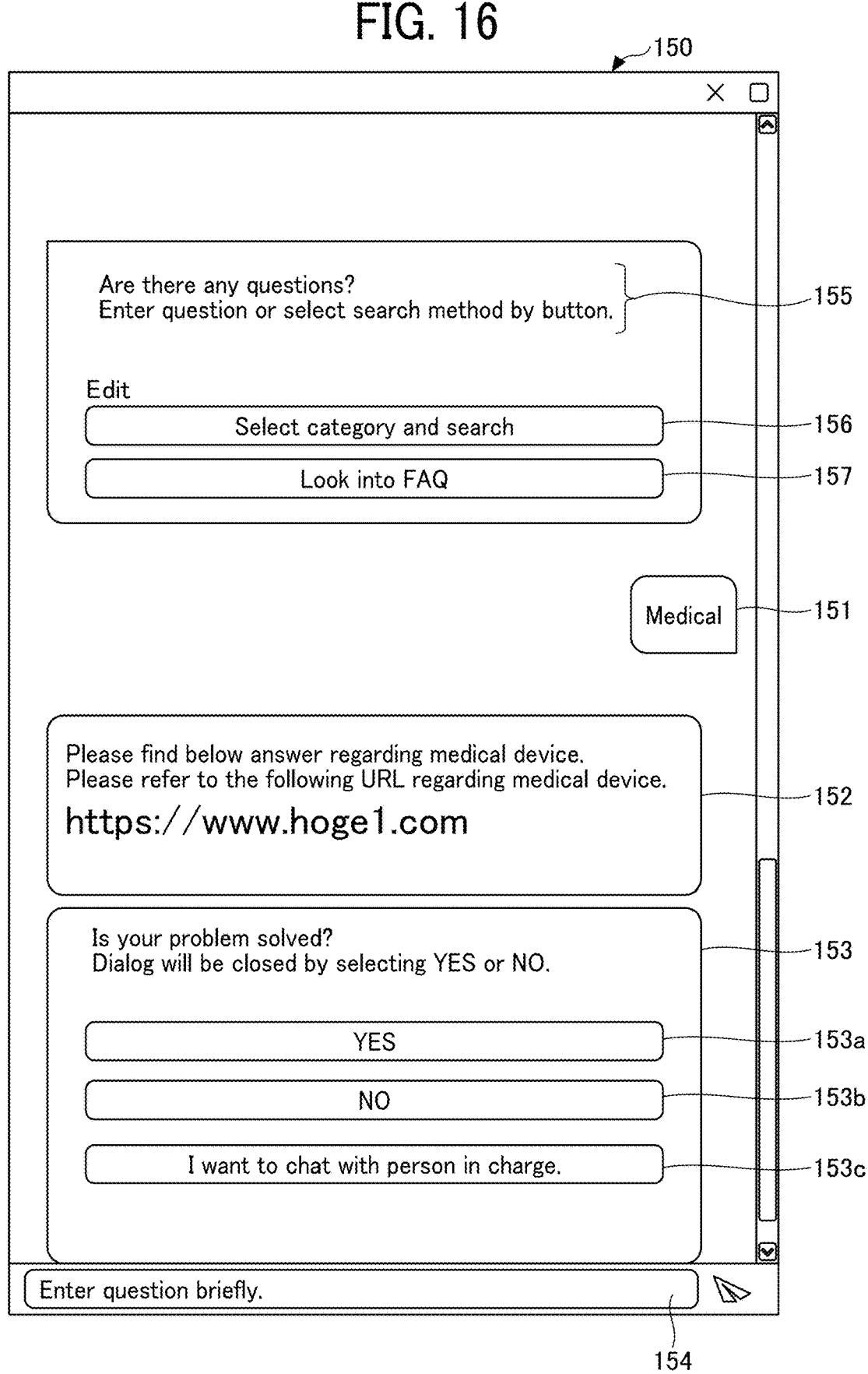
FIG. 16 is a diagram illustrating an example of a chat screen displayed on a user terminal.

FIG. 16 is a diagram illustrating an example of a chat screen 150 displayed by the user terminal 2. The user terminal 2 starts communication with the server 1, displays the chat screen 150, and displays the initial screen presenting a message 155 stating "Enter question or select search method by button", a category selection button 156, and an FAQ button 157. In FIG. 16, the user directly inputs a question 151 "medical" to a question input field 154.

An answer 152 to the user's question 151 "medical" by the response unit 13 is displayed. The question 151 is input from the question input field 154.

Further, the dialog control unit 15 transmits a feedback input field 153 to the user terminal 2 together with this answer. The feedback input field 153 receives a user rating for the answer. The feedback input field 153 includes a YES button 153a, a NO button 153b, and an operator chat button 153c (an example of a first button) for chatting with an operator in charge. The user presses the operator chat button 153c to request to chat directly with the operator in charge.

To display the operator chat button 153c, the dialog control unit 15 selects an operator corresponding to the category of question and answer information from the account information. The selected operator has "YES" for feasibility of manned chat and "standby" for manned chat status. In the case such operator is found, the dialog control unit 15 causes the user terminal 2 to display the operator chat button 153c. Specifically, the dialog control unit 15 switches between displaying and not displaying the screen having the operator chat button 153c.

By doing so, it is possible to prevent a situation in which an operator corresponding to the category of question and answer information is not found after the user presses the operator chat button 153c.

Figure 17:
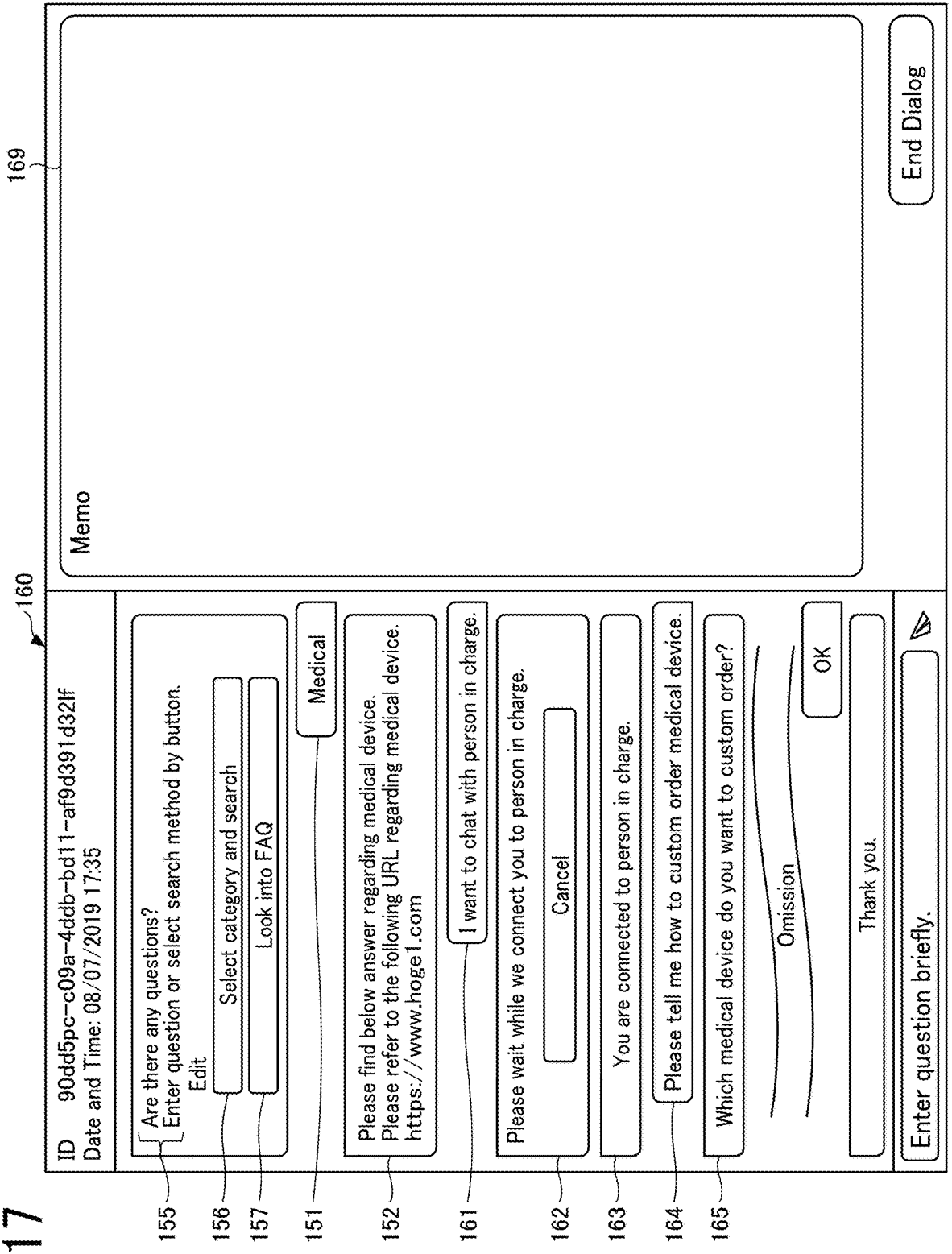
FIG. 17 is a diagram illustrating an example of the chat screen displayed by the operator

FIG. 17 is a diagram illustrating an example of the chat screen 160 displayed by the operator. The calling unit 17 transmits to the operator selected by the dialog control unit 15, chat history (the question 151 and answer 152 in FIG. 17) acquired from the chat history information storage unit 45 and identified by the session ID. Accordingly, the question 151 and the answer 152 of FIG. 16 are displayed on the chat screen 160 of FIG. 17.

In response to pressing of the operator chat button 153c, the dialog control unit 15 displays messages 161 and 162 such as "I want to chat with the person in charge" on the operator terminal 5 and the user terminal 2. Further, when the operator inputs a response to accept the question in response to the call, the dialog control unit 15 displays a message 163 "You are connected to the person in charge." on the operator terminal 5 and the user terminal 2. The operator terminal 5 is associated with the same session ID as the chat so far. The operator's remark is also stored in the chat history information storage unit 45 in association with the session ID.

In response to the user inputting a message 164 "Please tell me how to custom order a medical device" to the user terminal 2, the input unit 21 receives the message and the communication unit 23 transmits the message to the server 1.

In the server 1, the dialog control unit 15 transmits the message to the operator terminal 5 identified by the session ID, and the output unit 52 of the operator terminal 5 outputs the message.

In response to the operator inputting the message 165 "Which medical device do you want to custom order?" to the operator terminal 5, the input unit 51 receives the message and the communication unit 23 transmits the message to the server 1. In the server 1, the dialog control unit 15 transmits the message to the user terminal 2 identified by the session ID, and the output unit 22 of the user terminal 2 outputs the message 165.

The user and the operator continue to chat by repeating the above described process.

A memo field 169 in FIG. 17 is a field in which the operator can input a memo, a handwritten figure, or the like. In principle, the memo is not transmitted to the user terminal 2. Information input in the memo field 169 is transmitted to the user terminal 2 by an operation of the operator.

Figure 18:
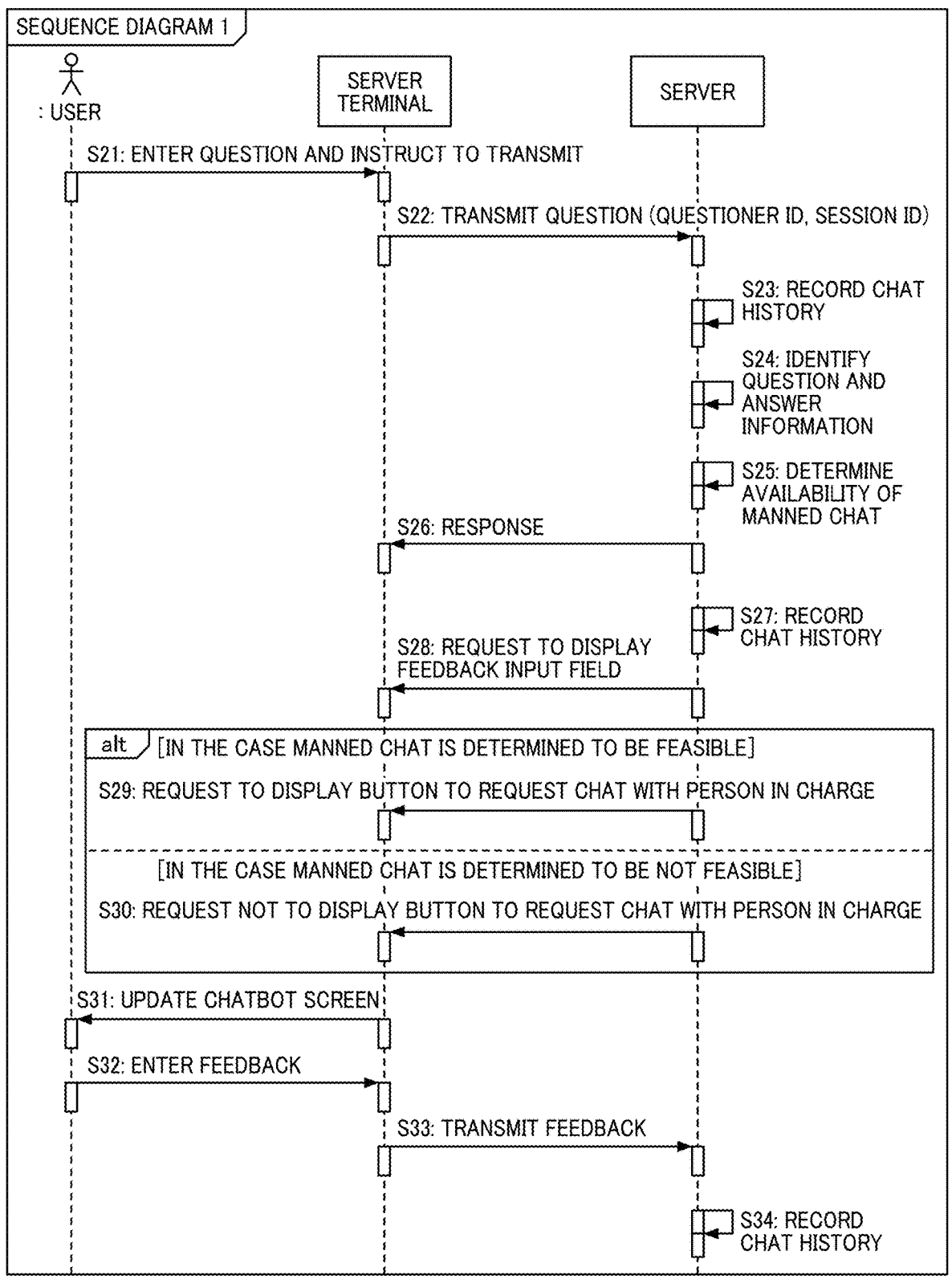
FIG. 18 is a sequence diagram illustrating an example of a process for the user to chat with a bot.

FIG. 18 is a sequence diagram illustrating an example of a process for the user to chat with the bot. The process of FIG. 18 starts from the state where the user terminal 2 is connected to the server 1 and the chat screen is displayed.

In step S21, the user inputs a question to the user terminal 2. The input unit 21 receives the input.

In step S22, the communication unit 23 of the user terminal 2 transmits a question to the server 1. A questioner ID and the session ID are attached to the question. The session ID is generated based on an establishment of connection between the user terminal 2 and the server 1 and is transmitted to the user terminal 2.

In step S23, the communication unit 14 of the server 1 receives the question, and the saving unit 16 stores the question or the like in the chat history information storage unit 45.

In step S24, the search unit 12 searches the question and answer information and identifies the answer.

In step S25, the dialog control unit 15 determines whether to display the operator chat button 153c. This is to determine whether to display the operator chat button 153c in the feedback input field 153. The details of the process are described with reference to FIG. 20.

In step S26, the response unit 13 transmits the answer to the user terminal 2.

In step S27, the saving unit 16 stores the answer in the chat history information storage unit 45.

In step S28, the dialog control unit 15 transmits the feedback input field to the user terminal 2 through the communication unit 14.

In step S29, based on the determination to display the operator chat button 153c, the dialog control unit 15 instructs the user terminal 2 to display the operator chat button 153c through the communication unit 14.

In step S30, based on the determination not to display the operator chat button 153c, the dialog control unit 15 instructs the user terminal 2 not to display the operator chat button 153c through the communication unit 14.

In step S31, the communication unit 23 of the user terminal 2 receives the instruction to display or not to display the operator chat button 153c, and the output unit 22 of the user terminal 2 updates the chat screen according to the instruction.

In step S32, the user inputs feedback (YES or NO) to the user terminal 2 in the feedback input field 153. The input unit 21 receives the input.

In step S33, the communication unit 23 transmits the feedback to the server 1.

In step S34, the communication unit 14 of the server 1 receives the feedback, and the saving unit 16 stores the resolution flag in the chat history information storage unit 45 based on the feedback.

Steps S25, S29, and S30 of FIG. 18 may be performed after step S33. In this case, the process of step S25 is executed according to the selection of "NO" in the feedback field and the dialog control unit 15 controls to display or not to display the operator chat button 153c according to the result of the determination.

In this case, based on the selection of the YES button 153a by the user, the dialog control unit 15 determines that the user is satisfied with the answer from the bot (determines that the manned chat is unnecessary), and determines not to display the operator chat button 153c regardless of presence or absence of an operator who can respond to the manned chat.

Figure 19:
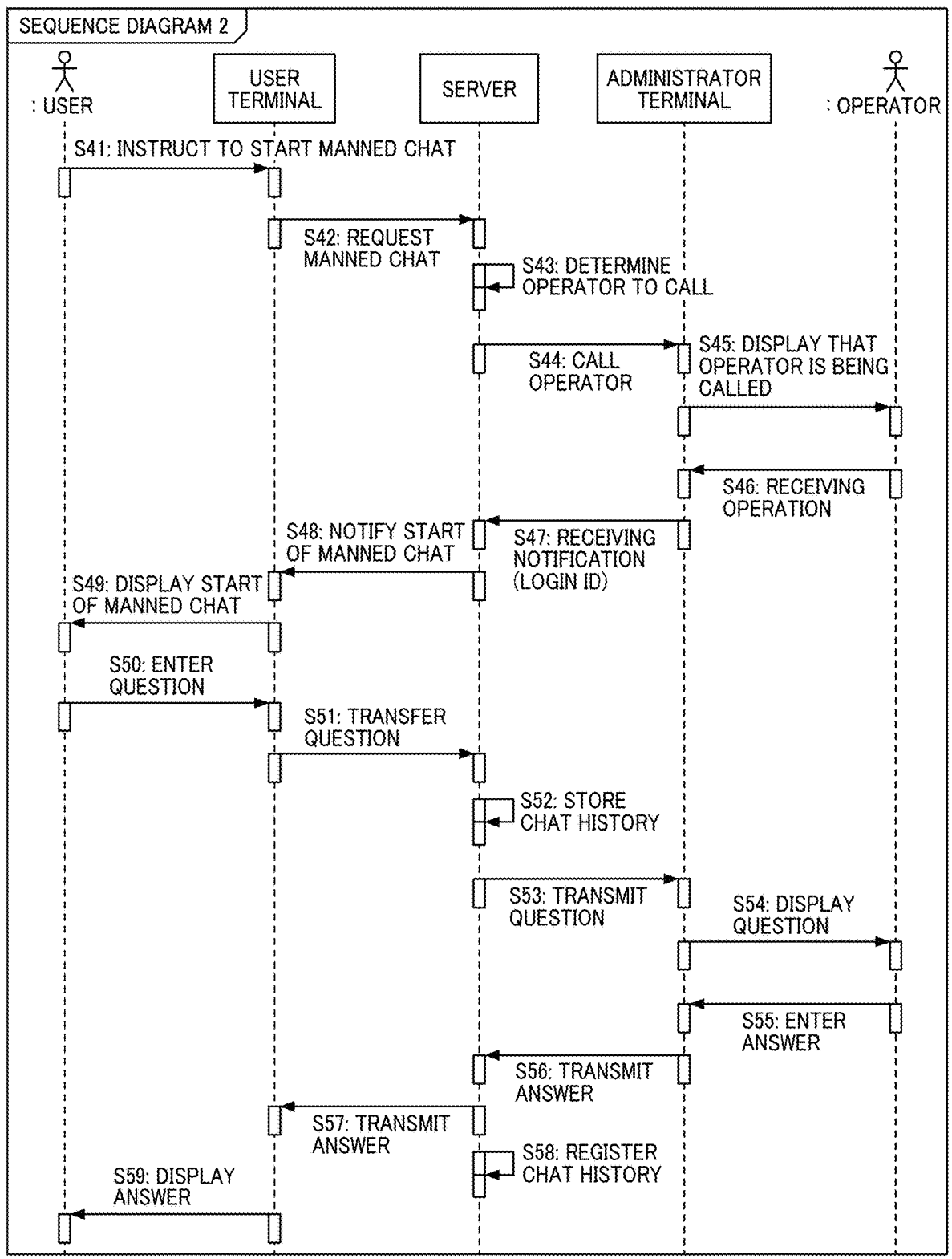
FIG. 19 is a sequence diagram illustrating an example of a process for the user to start a manned chat.

FIG. 19 is a sequence diagram illustrating an example of a process for the user to start a manned chat.

In step S41, the user presses the operator chat button 153c. The input unit 21 receives the input.

In step S42, the communication unit 23 of the user terminal 2 transmits a manned chat request to the server 1.

In step S43, the communication unit 14 of the server 1 receives the manned chat request, and the dialog control unit 15 determines the operator to be called. The details of a determination method are described with reference to FIG. 21.

In step S44, the calling unit 17 calls the determined operator terminal 5 with the IP address recorded at the time of login of the operator terminal 5 as the destination.

In step S45, the output unit 52 of the operator terminal 5 displays the call or notifies the call by sound.

In step S46, the operator inputs an operation for receiving a manned chat to the operator terminal 5. The input unit 51 receives the input.

In step S47, the communication unit 53 of the operator terminal 5 transmits a reception notification of the manned chat to the server 1. A login ID is attached to the reception notification.

In step S48, the communication unit 14 of the server 1 receives the reception notification and the dialog control unit 15 notifies the user terminal 2 of the start of the manned chat through the communication unit 14.

In step S49, the communication unit 23 of the user terminal 2 receives the start of the manned chat, and the output unit 22 displays the start of the manned chat.

In step S50, the user inputs a question to the user terminal 2. The input unit 21 receives the input.

In step S51, the communication unit 23 of the user terminal 2 transmits the question to the server 1. The questioner ID and the session ID are attached to the question.

In step S52, the communication unit 14 of the server 1 receives the question, and the saving unit 16 stores the question or the like in the chat history information storage unit 45.

In step S53, the dialog control unit 15 of the server 1 transmits the question to the operator terminal 5 through the communication unit 14. The IP address of the operator terminal 5 is stored when the operator logged in.

In step S54, the communication unit 53 of the operator terminal 5 receives the question, and the output unit 52 displays the question.

In step S55, the operator inputs the answer to the operator terminal 5. The input unit 51 receives the input.

In step S56, the communication unit 53 of the operator terminal 5 transmits the answer to the server 1.

In step S57, the communication unit 14 of the server 1 receives the answer and the dialog control unit 15 transmits the answer to the user terminal 2.

In step S58, the saving unit 16 stores the answer in the chat history information storage unit 45.

In step S59, the communication unit 23 of the user terminal 2 receives the answer and the output unit 22 displays the answer.

As described above, the user can switch from a chat with the bot to a chat with the operator.

Figure 20:
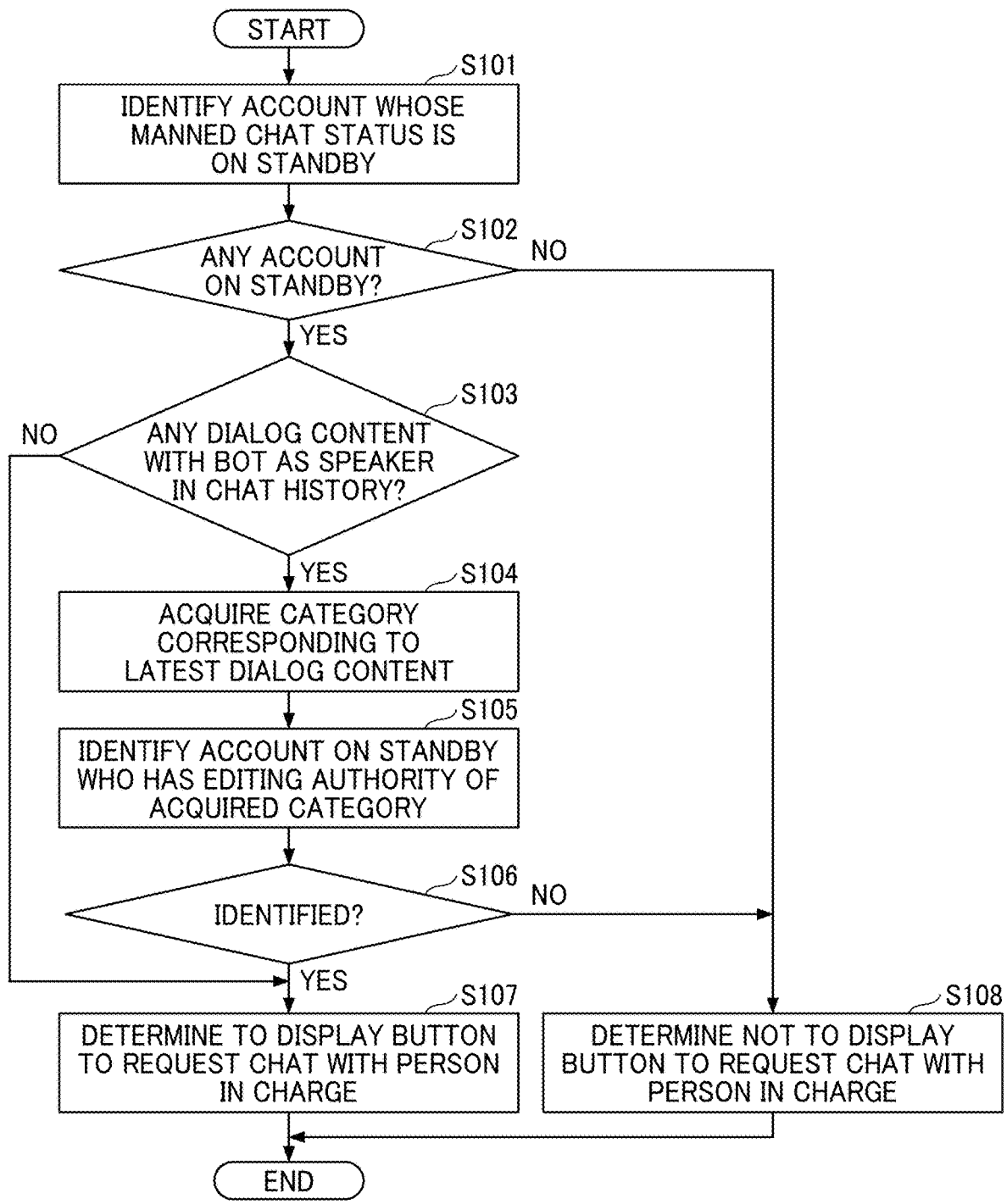
FIG. 20 is a flowchart illustrating an example of a detailed process of step S25 of FIG. 18.

FIG. 20 is a flowchart illustrating an example of a detailed process of step S25 of FIG. 18.

In step S101, the dialog control unit 15 refers to the account information storage unit 44 and identifies an account on standby.

In the case there is no account on standby, the dialog control unit 15 determines not to display the operator chat button 153c in step S108.

In the case there is an account on standby, the dialog control unit 15 determines whether chat history includes speech of the bot in the chat history information in step S103.

In the case the chat history does not include speech of the bot, the process proceeds to step S107, since the category of the question and answer information is not identified.

In the case the speech of the bot is included in the chat history, the dialog control unit acquires the category corresponding to the latest speech from the chat history information in step S104. The dialog control unit 15 may acquire a category corresponding to the first speech of the bot instead of the latest speech.

In step S105, the dialog control unit 15 identifies the account on standby who has the editing authority of the acquired category.

In the case the account is identified in step S105 (YES in step S106), the dialog control unit 15 determines to display the operator chat button 153c in step S107.

In the case the account is not identified in step S105 (NO in step S106), the dialog control unit 15 determines not to display the operator chat button 153c in step S108.

The determination of steps S102 and S105 are in no particular order.

Figure 21:
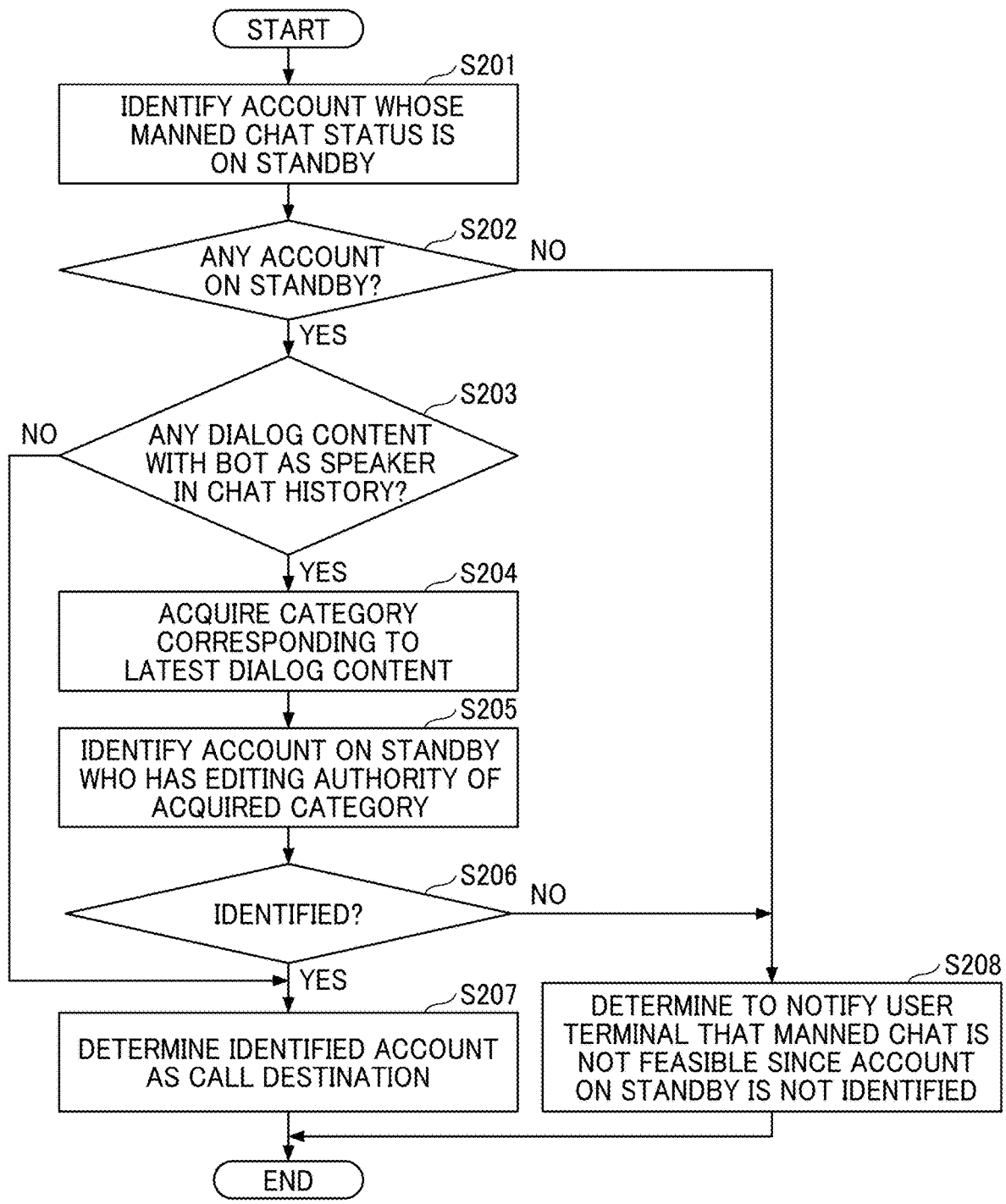
FIG. 21 is a flowchart illustrating an example of a detailed process of step S43 of FIG. 19.

FIG. 21 is a flowchart illustrating an example of a detailed process of step S43 of FIG. 19. In the description of FIG. 21, the difference from FIG. 20 is mainly described. Steps S201 to S206 may be the same as steps S101 to S106 of FIG. 20.

In step S208, since there is no account on standby, the dialog control unit 15 determines to notify the user terminal 2 that manned chat is not available.

Further, in step S207, the dialog control unit 15 determines the identified account as the call destination. In the case there are a plurality of accounts, the dialog control unit 15 may select any operator, or may select the operator who has passed the longest time since the last chat.

In FIG. 16, following a series of chats of questions and answers, the dialog control unit 15 displays the operator chat button 153c on the user terminal 2. However, such button may be constantly displayed on the user terminal 2. Hereinafter, this button is referred to as a manned support button to distinguish the button from the operator chat button 153c.

Figure 22:
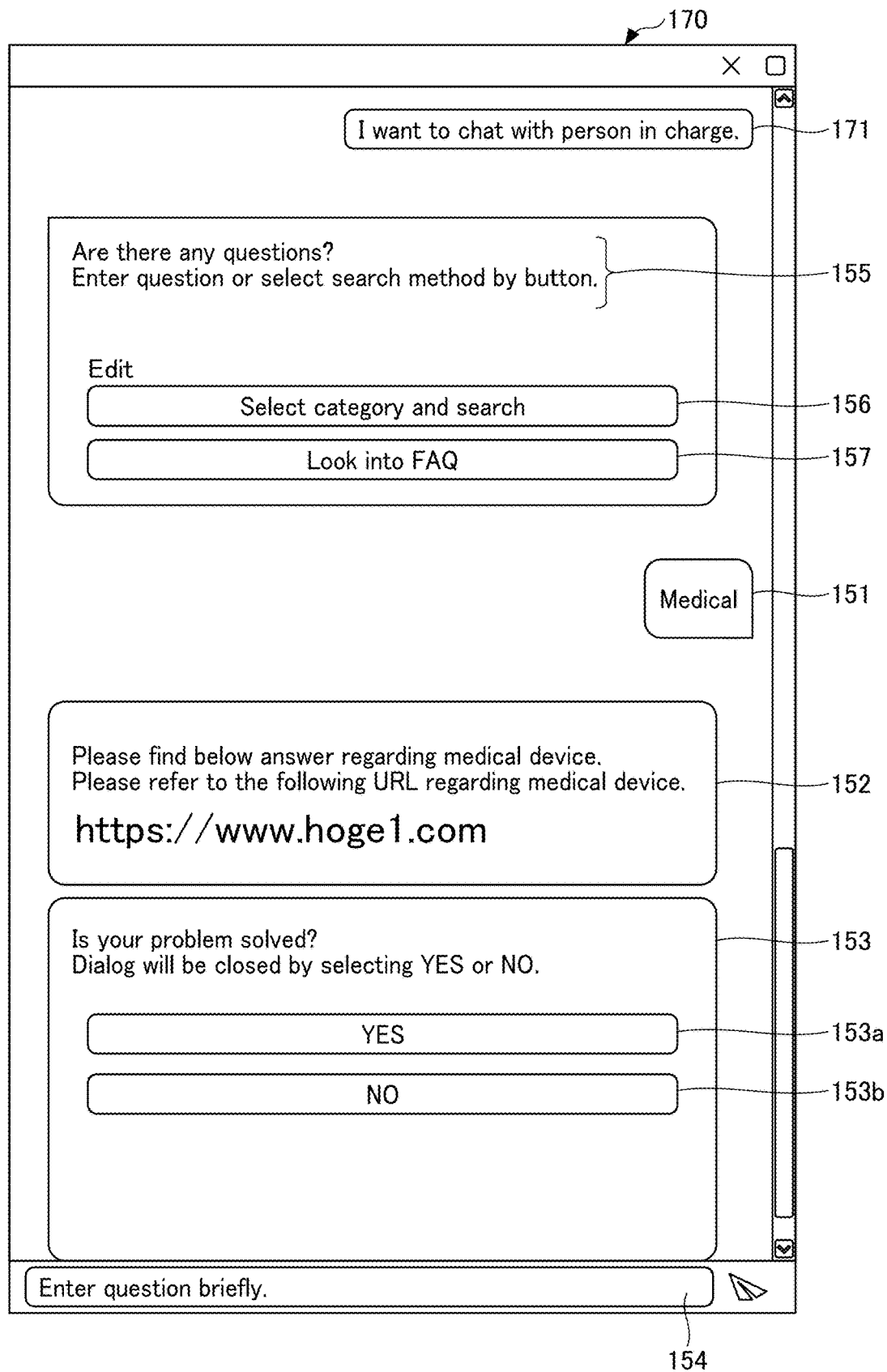
FIG. 22 is a diagram illustrating an example of the chat screen having a manned support button.

FIG. 22 is an example of a chat screen 170 including the manned support button 171. In the chat screen 170, the manned support button 171 (an example of a second button) is displayed at a predetermined position. The manned support button 171 is displayed at the position where the user can press the button at any time. To display the manned support button 171, the dialog control unit 15 makes the same determination as to whether to display the operator chat button 153c. The dialog control unit 15 switches between displaying and not displaying the manned support button 171 according to the determination result.

The timing of the determination to switch between the display and non-display of the manned support button 171 is as follows.

(i) Timing when the user terminal 2 connects to the server 1 and displays the chat screen.

(ii) Timing when the server 1 sends the answer to the user terminal 2.

(iii) Timing when "NO" is pressed on the feedback button (when the user does not get the desired answer)

(iv) A request for the display state of the manned support button 171 is sent from the user terminal 2 to the server 1, the server 1 periodically (for example, once every 10 seconds) determines the display state of the manned support button 171, and in response to a change in the display state, the latest display state is responded to the user terminal 2.

Since the manned support button 171 can be displayed in the case there is an operator corresponding to the category of question, the user can start chatting with the operator easier than the operator chat button 153c that is displayed after the answer.

In the chatbot system 100 of the present embodiment, since a category that can be edited by the administrator or the operator terminal or a category that can be supported is registered in the account information storage unit, a chat can be forwarded by automatically determining which operator can handle the category the user is asking. Also, since the editing authority of a category of the question and answer information is determined for each administrator, the administrator is not permitted to edit the question and answer information other than his or her own department, resulting in preventing accidental editing of question and answer information managed by other departments.

The above-described embodiment is illustrative and do not limit the present disclosure. Thus, numerous additional modifications and variations are possible in light of the above teachings within the scope of the present disclosure. Any one of the above described operations may be performed in various other ways, for example, in an order different from the one described above.

For example, the configuration example illustrated in FIG. 4 is divided according to the main functions in order to facilitate understanding of the processing by the user terminal 2, the administrator terminal 3, the operator terminal 5, and the server 1. The present disclosure is not limited by the way of dividing the processing unit or the name. The processing of the user terminal 2, the administrator terminal 3, the operator terminal 5, and the server 1 can be further divided into more processing units according to the processing content. Further, one process can be divided to include a larger number of processes.

The apparatuses or devices described in one or more embodiments are just one example of plural computing environments that implement the one or more embodiments disclosed herein. In one embodiment, the server 1 includes a plurality of computing devices such as a server cluster.

The plurality of computing devices is configured to communicate with one another through any type of communication link, including a network, shared memory, etc., and perform the processes disclosed herein.

Further, the server 1 can be configured to share the processing steps disclosed in the present embodiments, for example, FIGS. 15, 18, and 19 in various combinations. For example, a process executed by a given unit may be executed by a plurality of information processing apparatuses included in the server 1. Further, the server 1 may be integrated into one server or may be divided into a plurality of servers.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
circuitry configured to:
transmit to a first terminal, an answer to a question transmitted from the first terminal based on question and answer information; and
receive editing of the question and answer information, in a case the question and answer information belongs to a category with editing authority, the editing authority being assigned to an account logged in from a second terminal,
wherein, in a case that an operator is feasible to answer by chat to the question belonging to a certain category sent from the first terminal, the circuitry is further configured to:
determine that chat history includes speech of a bot in chat history information;
acquire the certain category corresponding to the latest speech from the chat history information;
identify an account on standby who has the editing authority of the acquired certain category; and
request the first terminal to display on the display a first button for receiving a chat with the operator on a screen on which the answer is to be displayed.

2. The information processing apparatus of claim 1, wherein
the circuitry is further configured to send to the second terminal, the question and answer information including control information for controlling display of the question and answer information belonging to the category with the editing authority for the account, based on account information associating the account and the category of the question and answer information with the editing authority.

3. The information processing apparatus of claim 1, wherein
the circuitry is further configured to send to the second terminal, the question and answer information belonging to the category with the editing authority, based on account information associating an administrator and the account assigned with the authority to edit the question and answer information.

4. The information processing apparatus of claim 1, wherein
the circuitry is further configured to request the first terminal to display on the display a second button for receiving a chat with the operator immediately after the answer is transmitted, when the operator is feasible to answer by chat to the question belonging to the certain category sent from the first terminal.

5. The information processing apparatus of claim 4, wherein
the circuitry is further configured to:
in response to receiving a request to chat with the operator by a pressing of one of the first button or the second button displayed on the display of the first terminal, identify the operator who answers by chat the question belonging to the certain category sent from the first terminal; and
call an operator terminal operated by the identified operator.

6. The information processing apparatus of claim 1, wherein
the circuitry is further configured to:
determine periodically whether the operator is feasible to answer by chat to the question belonging to the certain category sent from the first terminal; and
request to display on the display, a second button for receiving a chat with the operator when the operator is feasible to answer by chat to the question belonging to the certain category.

7. The information processing apparatus of claim 1, wherein
the account information associating the account and the category with the editing authority of the question and answer information includes the category of the question and answer information that the account is feasible to handle by manned chat, and
the circuitry is further configured to determine whether the operator is feasible to answer by chat to the question belonging to the certain category sent from the first terminal based on the account information.

8. The information processing apparatus of claim 1, wherein
the account information associating the account and the category with the editing authority of the question and answer information includes an editable category of the question and answer information, and
the circuitry is further configured to determine whether the operator is feasible to answer by chat to the question belonging to the certain category sent from the first terminal based on the account information.

9. An information processing system comprising:
an information processing apparatus configured to transmit to a first terminal, an answer to a question transmitted from the first terminal based on question and answer information; and
a second terminal communicably connected to each other, the information processing apparatus including:
circuitry configured to receive editing of the question and answer information, in a case the question and answer information belongs to a category with editing authority, the editing authority being assigned to an account logged in from a second terminal, and
the second terminal including:
circuitry configured to:
receive the question and answer information; and
display on a display, the question and answer information for the category with editing authority for the account, wherein
in a case that an operator is feasible to answer by chat to the question belonging to a certain category sent from the first terminal, the circuitry of the information processing apparatus is further configured to:
determine that chat history includes speech of a bot in chat history information;
acquire the certain category corresponding to the latest speech from the chat history information;
identify an account on standby who has the editing authority of the acquired certain category; and
request the first terminal to display on a display a first button for receiving a chat with the operator on a screen on which the answer is to be displayed.

10. The information processing system of claim 9, wherein
the circuitry of the first terminal is configured to display the first button for receiving a chat with the operator on a screen on which the answer is to be displayed.

11. An information management method performed by an information processing apparatus, the method comprising:
transmitting to a first terminal, an answer to a question transmitted from the first terminal based on question and answer information;
receiving editing of the question and answer information, in a case the question and answer information belongs to a category with editing authority, the editing authority being assigned to an account logged in from a second terminal;
determining that an operator is feasible to answer by chat to the question belonging to a certain category sent from the first terminal,
determining that chat history includes speech of a bot in chat history information;
acquiring the certain category corresponding to the latest speech from the chat history information;
identifying an account on standby who has the editing authority of the acquired certain category; and
requesting the first terminal to display a first button for receiving a chat with an operator on a screen on which the answer is to be displayed.

12. The information management method of claim 11, further comprising:
sending to the second terminal, the question and answer information including control information for controlling display of the question and answer information belonging to the category with the editing authority for the account, based on account information associating the account and the category of the question and answer information with the editing authority.

13. The information management method of claim 11, further comprising:
sending to the second terminal, the question and answer information belonging to the category with the editing authority, based on account information associating an administrator and the account assigned with the authority to edit the question and answer information.

14. The information management method of claim 11, further comprising:
requesting the first terminal to display on a display, a first button for receiving a chat with an operator on a screen on which the answer is to be displayed, when an operator is feasible to answer by chat to a question belonging to a certain category sent from the first terminal.

15. The information management method of claim 14, further comprising:
in response to receiving a request to chat with the operator by a pressing of one of the first button or the second button displayed on the first terminal, identifying the operator who answers by chat the question belonging to the certain category sent from the first terminal; and
calling an operator terminal operated by the identified operator.

16. The information management method of claim 11, further comprising:
determining periodically whether the operator is feasible to answer by chat to the question belonging to the certain category sent from the first terminal; and
requesting to display on the display, a second button for receiving a chat with the operator when the operator is feasible to answer by chat to the question belonging to the certain category.

17. The information management method of claim 11, wherein
the account information associating the account and the category with the editing authority of the question and answer information includes the category of the question and answer information that the account is feasible to handle by manned chat, the method further including determining whether the operator is feasible to answer by chat to the question belonging to a certain category sent from the first terminal based on the account information.

18. The information management method of claim 11, wherein
the account information associating the account and the category with the editing authority of the question and answer information includes an editable category of the question and answer information, the method further including determining whether the operator is feasible to answer by chat to the question belonging to the certain category sent from the first terminal based on the account information.

* * * * *